United States Patent
Ho et al.

(10) Patent No.: US 12,023,633 B2
(45) Date of Patent: Jul. 2, 2024

(54) MEMBRANES FOR GAS SEPARATION

(71) Applicant: Ohio State Innovation Foundation, Columbus, OH (US)

(72) Inventors: W. S. Winston Ho, Columbus, OH (US); Dongzhu Wu, Burlington, MA (US); Yang Han, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 377 days.

(21) Appl. No.: 16/640,791

(22) PCT Filed: Aug. 21, 2018

(86) PCT No.: PCT/US2018/047239
§ 371 (c)(1),
(2) Date: Feb. 21, 2020

(87) PCT Pub. No.: WO2019/040445
PCT Pub. Date: Feb. 28, 2019

(65) Prior Publication Data
US 2020/0398229 A1    Dec. 24, 2020

Related U.S. Application Data

(60) Provisional application No. 62/548,205, filed on Aug. 21, 2017, provisional application No. 62/548,195, filed on Aug. 21, 2017.

(51) Int. Cl.
*B01D 53/22* (2006.01)
*B01D 67/00* (2006.01)
(Continued)

(52) U.S. Cl.
CPC ........... *B01D 71/82* (2013.01); *B01D 53/228* (2013.01); *B01D 67/00793* (2022.08);
(Continued)

(58) Field of Classification Search
CPC ................ B01D 69/02; B01D 2256/20; B01D 2257/2045; B01D 2256/10; B01D 71/021;
(Continued)

(56) References Cited

U.S. PATENT DOCUMENTS 4,039,440 A * 8/1977 Cadotte ............... B01D 69/125
264/41
5,178,765 A   1/1993 Hu et al.
(Continued)

FOREIGN PATENT DOCUMENTS

CN     105873667 A    8/2016
JP     2017136546 A1  8/2017
(Continued)

OTHER PUBLICATIONS

"Several" American Heritage® Dictionary of the English Language, Fifth Edition. 2016 by Houghton Mifflin Harcourt Publishing Company, 1 page, https://www.thefreedictionary.com/several (Year: 2016).*

(Continued)

*Primary Examiner* — Anthony R Shumate
(74) *Attorney, Agent, or Firm* — Meunier Carlin & Curfman LLC

(57) ABSTRACT

Membranes, methods of making the membranes, and methods of using the membranes are described herein. The membranes can comprise a support layer, and a selective polymer layer disposed on the support layer. In some cases, the support layer can comprise a gas permeable polymer and hydrophilic additive dispersed within the gas permeable polymer. In some cases, the selective polymer layer can comprise a selective polymer matrix and carbon nanotubes dispersed within the selective polymer matrix. The membranes can exhibit selective permeability to gases. As such, (Continued)

the membranes can be for the selective removal of carbon dioxide and/or hydrogen sulfide from hydrogen and/or nitrogen.

31 Claims, 4 Drawing Sheets

(51) Int. Cl.
| | |
|---|---|
| B01D 69/02 | (2006.01) |
| B01D 69/10 | (2006.01) |
| B01D 69/12 | (2006.01) |
| B01D 69/14 | (2006.01) |
| B01D 71/02 | (2006.01) |
| B01D 71/44 | (2006.01) |
| B01D 71/60 | (2006.01) |
| B01D 71/68 | (2006.01) |
| B01D 71/82 | (2006.01) |

(52) U.S. Cl.
CPC .......... *B01D 69/02* (2013.01); *B01D 69/107* (2022.08); *B01D 69/1216* (2022.08); *B01D 69/125* (2013.01); *B01D 69/148* (2013.01); *B01D 71/0212* (2022.08); *B01D 71/441* (2022.08); *B01D 71/601* (2022.08); *B01D 71/68* (2013.01); *B01D 2256/10* (2013.01); *B01D 2256/16* (2013.01); *B01D 2256/20* (2013.01); *B01D 2257/2045* (2013.01); *B01D 2257/304* (2013.01); *B01D 2257/504* (2013.01); *B01D 2323/02* (2013.01); *B01D 2323/30* (2013.01); *B01D 2325/20* (2013.01)

(58) Field of Classification Search
CPC .......... B01D 2256/16; B01D 2257/304; B01D 67/0079; B01D 2325/20; B01D 71/82; B01D 71/68; B01D 71/60; B01D 53/228; B01D 69/125; B01D 2257/504; B01D 69/148; B01D 2323/30; B01D 2323/02; B01D 69/10

See application file for complete search history.

(56) References Cited

U.S. PATENT DOCUMENTS

| | | | | |
|---|---|---|---|---|
| 6,099,621 | A * | 8/2000 | Ho | B01D 53/228 525/61 |
| 7,964,020 | B2 | 6/2011 | Baker et al. | |
| 9,216,390 | B2 | 12/2015 | Ho et al. | |
| 2006/0094852 | A1 * | 5/2006 | Yuan | C08L 79/08 528/125 |
| 2006/0162577 | A1 * | 7/2006 | Jorgensen | A23L 3/3418 99/468 |
| 2006/0290021 | A1 * | 12/2006 | Li | H01L 51/105 264/509 |
| 2008/0168900 | A1 * | 7/2008 | Ho | B01D 69/125 264/41 |
| 2008/0290020 | A1 * | 11/2008 | Marand | B01D 71/021 264/108 |
| 2010/0206811 | A1 | 8/2010 | Ng et al. | |
| 2011/0108478 | A1 | 5/2011 | Taguchi et al. | |
| 2011/0150702 | A1 * | 6/2011 | Kim | F16K 99/0015 156/60 |
| 2011/0275112 | A1 * | 11/2011 | Sarver, Jr. et al. | C12M 41/34 435/287.5 |
| 2012/0080378 | A1 | 4/2012 | Revanur et al. | |
| 2013/0251604 | A1 * | 9/2013 | Kim | B01L 3/502738 422/504 |
| 2014/0076161 | A1 | 3/2014 | Li et al. | |
| 2016/0051939 | A1 | 2/2016 | Choi et al. | |
| 2016/0074814 | A1 * | 3/2016 | Park | B01D 71/024 210/500.33 |
| 2017/0056839 | A1 | 3/2017 | Ho et al. | |
| 2017/0209838 | A1 | 7/2017 | Ho et al. | |
| 2017/0354918 | A1 * | 12/2017 | Liu | B01D 69/10 |
| 2020/0009500 | A1 * | 1/2020 | Liu | F24F 3/147 |
| 2020/0101416 | A1 * | 4/2020 | Liu | B01D 69/142 |
| 2022/0008867 | A1 * | 1/2022 | Rahaman | B01D 69/02 |
| 2022/0032239 | A1 * | 2/2022 | Ho | B01D 69/10 |

FOREIGN PATENT DOCUMENTS

| | | |
|---|---|---|
| WO | 98/41313 | 9/1998 |
| WO | 2006/050531 | 5/2006 |
| WO | 2008/028155 | 3/2008 |
| WO | 2013/170249 | 11/2013 |
| WO | 2015103063 A1 | 7/2015 |
| WO | 2016/196474 A1 | 12/2016 |
| WO | 2017135230 A1 | 8/2017 |

OTHER PUBLICATIONS

Ran "Polyethersulfone Membrane" Springer-Verlag Berlin Heidelberg 2015 E. Droli, L. Giorno (eds.), Encyclopedia of Membranes, 2 pages (Year: 2015).*
Chen "High-molecular-weight polyvinylamine/piperazine glycinate membranes for CO2 capture from flue gas" Journal of Membrane Science, vol. 514, Sep. 15, 2016, pp. 376-384 (Year: 2016).*
STP American Heritage Dictionary of the English Language, Fifth Edition. 2016 by Houghton Mifflin Harcourt Publishing Company. 1 page. (Year: 2016).*
International Search Report and Written Opinion issued by the International Searching Authority (ISA/US) in PCT Application No. PCT/US2018/047239 dated Oct. 24, 2018. 9 pages.
M. Sandru, S.H. Haukebø, and M.B. Hägg, "Composite Hollow Fiber Membranes for CO2 Capture", J. Membr. Sci., 346 (2010) 172-186.
Y. Zhao, B.T. Jung, L. Ansaloni, and W.S.W. Ho, "Multiwalled Carbon Nanotube Mixed Matrix Membranes Containing Amines for High Pressure CO2/H2 Separation", J. Membr. Sci., 459 (2014) 233-243.
L. Ansaloni, Y. Zhao, B.T. Jung, K. Ramasubramanian, M.G. Baschetti, and W.S.W. Ho, "Facilitated Transport Membranes Containing Amino-Functionalized Multi-Walled Carbon Nanotubes for High-Pressure CO2 Separations", J. Membr. Sci., 490 (2015) 18-28.
Y. Chen and W.S.W. Ho, "High-Molecular-Weight Polyvinylamine/ Piperazine Glycinate Membranes for CO2 Capture from Flue Gas", J. Membr. Sci., 514 (2016) 376-384.
International Preliminary Report on Patentability issued for Application No. PCT/US2018/047239, dated Mar. 5, 2020.
Liao, Jiayou, et al. "A high performance PVAm-HT membrane containing high-speed facilitated transport channels for CO 2 separation." Journal of Materials Chemistry A 3.32 (2015): 16746-16761.
Extended European Search Report issued by the European Patent Office in European Application No. 18848516.3 dated Mar. 24, 2021. 7 pages.
Office Action, dated Jun. 28, 2021, issued in corresponding CN Patent Application No. 201880067653.8 (with English translation).
Office Action, dated Jun. 6, 2022, issued in corresponding JP Patent Application No. 2020510550 (with English translation).
Communication Pursuant to Article 94(3) EPC, issued for Application No. 18848516.3, dated Mar. 30, 2023.
Zi Tong et al.: "New sterically hindered polyvinylarnine membranes for CO2 separation and capture", Journal of Membrane Science, vol. 543, Aug. 25, 2017 (Aug. 25, 2017), pp. 202-211, XP055674459, NL ISSN: 0376-7388, DOI: 10.1016/j.memsci.2017.08.057.
Varun Vakharia: "Development of Membrane Technology for CO 2 Removal and H 2 Purification: A Techno-Economic, Lab-Scale, and Pilot-Scale Study", https://etd.ohiolink.edu/letd.send_file?accession=0su1480453792157218&disposition=inline, Dec. 31, 2016 (Dec. 31, 2016), pp. 1-198, XP055723139, The Ohio State University [retrieved on Aug. 17, 2020].

(56) References Cited

OTHER PUBLICATIONS

Wu, Dongzhu, et al. "Synthesis and characterization of nanoporous polyethersulfone membrane as support for composite membrane in CO2 separation: From lab to pilot scale." Journal of Membrane Science 510 (2016): 58-71.
Saedi, Shahab, et al. "Facilitated transport of CO 2 through novel imidazole-containing chitosan derivative/PES membranes." RSC advances 5.82 (2015): 67299-67307.
Saeed, Muhammad, et al. "Tailoring of water swollen PVA membrane for hosting carriers in CO2 facilitated transport membranes." Separation and purification technology 179 (2017): 550-560.
Office Action issued for Korean Application No. 10-2020-7008230, dated Feb. 17, 2023.

* cited by examiner

MEMBRANES FOR GAS SEPARATION

CROSS-REFERENCE TO RELATED APPLICATIONS

This application is a national stage application filed under 35 U.S.C. § 371 of PCT/US2018/047239 filed Aug. 21, 2018, which claims benefit of U.S. Provisional Application No. 62/548,205, filed Aug. 21, 2017, and U.S. Provisional Application No. 62/548,195, filed Aug. 21, 2017, each of which is hereby incorporated herein by reference in its entirety.

STATEMENT REGARDING GOVERNMENT SUPPORT

This invention was made with government support under grant number DE-FE0026919 awarded by the Department of Energy. The government has certain rights in the invention.

BACKGROUND

There are numerous industrial processes that produce gas streams containing carbon dioxide, hydrogen sulfide, and hydrogen chloride, or gas streams containing carbon dioxide, nitrogen oxides, and sulfur oxides. It is often desirable to remove one or more of these gases from the other components of the gas streams, such as hydrogen and nitrogen. Selectively permeable polymeric membranes have been investigated for a variety of gas separation applications, including hydrogen purification and carbon dioxide sequestration. However, there remains a need in the art for membranes, methods of making membranes, and methods of separating gases.

SUMMARY

Membranes, methods of making the membranes, and methods of using the membranes are described herein. The membranes can comprise a support layer, and a selective polymer layer disposed on the support layer.

In some embodiments, the support layer can comprise a gas permeable polymer and a hydrophilic additive dispersed within the gas permeable polymer.

The support layer can comprise a gas permeable polymer and a hydrophilic additive dispersed within the gas permeable polymer. The gas permeable polymer can be a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer comprises polyethersulfone.

In some embodiments, the hydrophilic additive comprises a hydrophilic polymer. The hydrophilic polymer can be electrically neutral or charged. Examples of suitable hydrophilic additive include polyvinylpyrrolidone (PVP), hydroxylated polyethersulfone (PES-OH), sulfonated polysulfone (SPSf), polyvinylalcohol, polyacrylic acid, polymethacrylic acid, polyethyleneglycol, polyacrylamide, sulfonated polystyrene, copolymers thereof, or blends thereof. In certain embodiments, the hydrophilic additive can comprise polyvinylpyrrolidone (PVP), hydroxylated polyethersulfone (PES-OH), sulfonated polysulfone (SPSf), copolymers thereof, or blends thereof. In some embodiments, the hydrophilic additive can be present in the gas permeable polymer in an amount of from 0.05% to 20% by weight (e.g., from 0.05% to 10% by weight, from 0.05% to 5% by weight, or from 0.1% to 2.5% by weight), based on the total dry weight of the gas permeable polymer and the hydrophilic additive.

By introducing the hydrophilic additive into the gas permeable polymer, the surface properties and morphology of the support layer (and by extension the transport performance of the support layer) can be significantly enhanced relative to identical support layers lacking the hydrophilic additive. In some examples, the support layer can exhibit a surface porosity of from 10% to 25%, an average pore size of from 20 nm to 90 nm, or a combination thereof as measured by scanning electron microscopy (SEM). In some examples, the support layer can exhibit a water contact angle of 75° or less (e.g., a water contact angle of from 60° to 75°), as measured by goniometry. In some embodiments, the support layer can exhibit a $CO_2$ permeance of at least 12,000 GPU (e.g., a $CO_2$ permeance of from 12,000 GPU to 30,000 GPU) at 57° C. and 1 atm feed pressure. The improved properties of the support layer can imbue the resulting composite membranes with improved transport properties. In certain cases, the gas permeable polymer (and accompanying hydrophilic additive) can be disposed on a base (e.g., a nonwoven fabric such as a polyester nonwoven).

The selective polymer matrix can have a $CO_2:N_2$ selectivity of from 10 to 500 (e.g., from 75 to 350) at 57° C. and 1 atm feed pressure. The selective polymer matrix can comprise a hydrophilic polymer, an amino compound, or a combination thereof. In some embodiments, the hydrophilic polymer can be absent (e.g., the selective polymer matrix can comprise one or more amino compounds). In other embodiments, the selective polymer matrix can comprise a combination of a hydrophilic polymer and an amino compound. For example, in some cases, the selective polymer matrix can comprise an amino compound dispersed in a hydrophilic polymer matrix.

The amino compound can be, for example, an amine-containing polymer, a low molecular weight amino compound, or a combination thereof. In some embodiments, the amino compound comprises an amine-containing polymer, such as polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amino compound can comprise a low molecular weight amino compound, such as a salt of a primary amine or a salt of a secondary amine. In certain cases, the selective polymer matrix can comprise a mixture of two or more amino compounds (e.g., an amine-containing polymer and a low molecular weight amino compound).

The hydrophilic polymer can comprise, for example, a polymer selected from the group consisting of polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the selective polymer can further comprise a cross-linking agent, such as formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof.

In some embodiments, the selective polymer layer can further comprise carbon nanotubes dispersed within the selective polymer matrix. The carbon nanotubes can comprise single-walled carbon nanotubes, multiwalled carbon nanotubes, or a combination thereof. In some cases, the carbon nanotubes can have an average diameter of from 10 nm to 50 nm, an average length of from 50 nm to 20 μm (e.g., from 200 nm to 20 μm), or a combination thereof. In some cases, the carbon nanotubes can comprise unfunctionalized carbon nanotubes. In other embodiments, the carbon nanotubes can comprise sidewall functionalized carbon nanotubes. For example, the carbon nanotubes can comprise hydroxy-functionalized carbon nanotubes, carboxy-functionalized carbon nanotubes, amine-functionalized carbon nanotubes, or a combination thereof. In some embodiments, the selective polymer layer can comprise from 0.5% to 5% by weight carbon nanotubes, based on the total dry weight of the selective polymer layer.

In some embodiments, the selective polymer layer can comprise a selective polymer matrix and carbon nanotubes dispersed within the selective polymer matrix.

The support layer can comprise a gas permeable polymer. The gas permeable polymer can be a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer comprises polyethersulfone. In certain cases, the gas permeable support layer comprises a gas permeable polymer disposed on a base (e.g., a nonwoven fabric such as a polyester nonwoven).

The selective polymer matrix can have a $CO_2:N_2$ selectivity of from 10 to 500 (e.g., from 75 to 350) at 57° C. and 1 atm feed pressure. The selective polymer matrix can comprise a hydrophilic polymer, an amino compound, or a combination thereof. In some embodiments, the hydrophilic polymer can be absent (e.g., the selective polymer matrix can comprise one or more amino compounds). In other embodiments, the selective polymer matrix can comprise a combination of a hydrophilic polymer and an amino compound. For example, in some cases, the selective polymer matrix can comprise an amino compound dispersed in a hydrophilic polymer matrix.

The amino compound can be, for example, an amine-containing polymer, a low molecular weight amino compound, or a combination thereof. In some embodiments, the amino compound comprises an amine-containing polymer, such as polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amino compound can comprise a low molecular weight amino compound, such as a salt of a primary amine or a salt of a secondary amine. In certain cases, the selective polymer matrix can comprise a mixture of two or more amino compounds (e.g., an amine-containing polymer and a low molecular weight amino compound).

The hydrophilic polymer can comprise, for example, a polymer selected from the group consisting of polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the selective polymer can further comprise a cross-linking agent, such as formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof.

The carbon nanotubes can comprise single-walled carbon nanotubes, multiwalled carbon nanotubes, or a combination thereof. In some cases, the carbon nanotubes can have an average diameter of from 10 nm to 50 nm, an average length of from 50 nm to 20 μm (e.g., from 200 nm to 20 μm), or a combination thereof. In some cases, the carbon nanotubes can comprise unfunctionalized carbon nanotubes. In other embodiments, the carbon nanotubes can comprise sidewall functionalized carbon nanotubes. For example, the carbon nanotubes can comprise hydroxy-functionalized carbon nanotubes, carboxy-functionalized carbon nanotubes, amine-functionalized carbon nanotubes, or a combination thereof. In some embodiments, the selective polymer layer can comprise from 0.5% to 5% by weight carbon nanotubes, based on the total dry weight of the selective polymer layer.

The membranes described herein can exhibit selective permeability to gases. For example, the membranes can be used to selectively remove carbon dioxide and/or hydrogen sulfide from hydrogen and/or nitrogen.

Also provided are methods for separating a first gas from a feed gas stream. These methods can include contacting any of the membranes described herein with the feed gas stream comprising the first gas under conditions effective to afford transmembrane permeation of the first gas. The membrane can comprise a feed side and a permeate side. In some embodiments, the method further can further comprise applying a vacuum to the permeate side of the membrane to remove the first gas. In some embodiments, the membrane can exhibit a $CO_2$ permeance of at least 500 GPU (e.g., from 500 to 1500 GPU) at 57° C. and 1 atm feed pressure when a vacuum is applied to the permeate side of the membrane (e.g., at a permeate pressure of 0.2 atm).

The feed gas can comprise hydrogen, carbon dioxide, hydrogen sulfide, hydrogen chloride, carbon monoxide, nitrogen, methane, steam, sulfur oxides, nitrogen oxides, or combinations thereof. In some cases, the feed gas can have a temperature of at least 100° C. In some cases, the first gas can be chosen from carbon dioxide, hydrogen sulfide, hydrogen chloride, and combinations thereof. In some embodiments, the feed gas can further comprise a second gas selected from the group consisting of nitrogen, hydrogen, carbon monoxide, and combinations thereof, and the membrane can exhibit a first gas/second gas selectivity (e.g., a $CO_2:N_2$ selectivity) of from 10 to 500 (e.g., from 20 to 300) at 57° C. and 1 atm feed pressure.

Methods of making the membranes described herein are also provided.

In some embodiments, methods of making membranes can include depositing a selective polymer layer on a support layer, wherein the support layer comprises a gas permeable polymer and a hydrophilic additive dispersed within the gas permeable polymer. Methods can further comprise forming the support layer from a casting solution that comprises a gas permeable polymer, a hydrophilic additive, a pore forming agent, and a solvent/non-solvent mixture.

In some embodiments, methods of making membranes can include depositing a selective polymer layer on a support layer. The selective polymer layer can comprise a selective polymer matrix and carbon nanotubes dispersed within the selective polymer matrix

DETAILED DESCRIPTION

Figure 1:
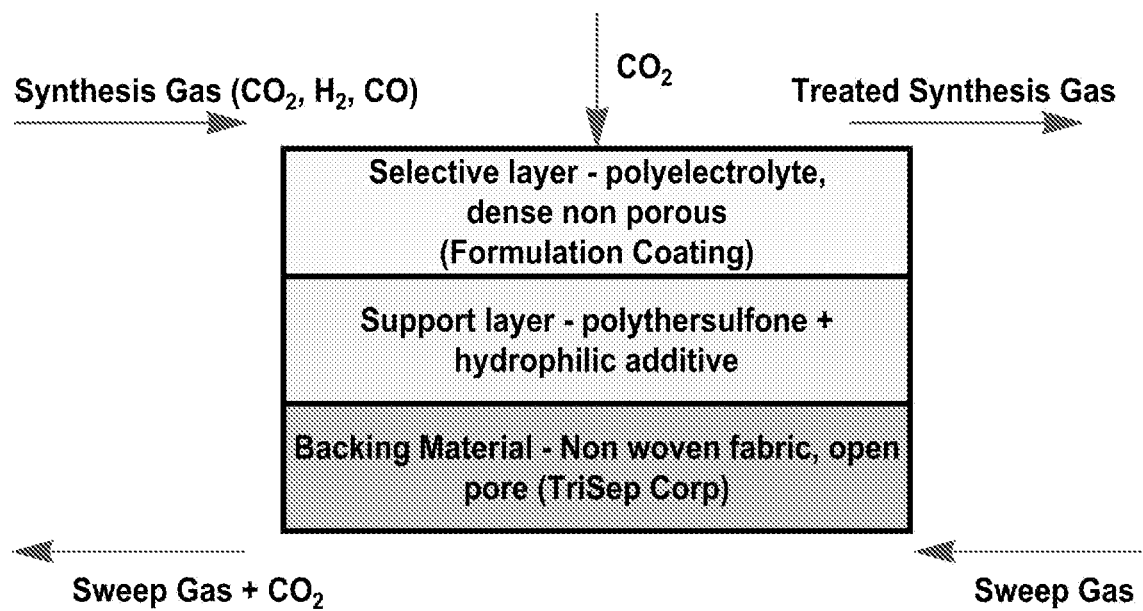
FIG. 1 is a schematic diagram illustrating the composition of the composite membranes described herein including a hydrophilic additive.

Membranes, methods of making the membranes, and methods of using the membranes are described herein. The membranes can comprise a support layer, and a selective polymer layer disposed on the support layer.

Membranes Including Hydrophilic Additives

In some embodiments, the support layer can comprise a gas permeable polymer and a hydrophilic additive dispersed within the gas permeable polymer. The membranes can exhibit selective permeability to gases.

The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, nitrile-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-iso-propylsiloxane, polydiphenylsiloxane, polyethersulfone, polyphenylsulfone, polysulfone, polyacrylonitrile, polyvinylidene fluoride, polyamide, polyimide, polyetherimide, polyetheretherketone, polyphenylene oxide, polybenzimidazole, polypropylene, polyethylene, partially fluorinated, perfluorinated or sulfonated derivatives thereof, copolymers thereof, or blends thereof. In some embodiments, the gas permeable polymer can be polysulfone or polyethersulfone. If desired, the support layer can include inorganic particles to increase the mechanical strength without altering the permeability of the support layer.

The hydrophilic additive can comprise a hydrophilic polymer. The hydrophilic polymer can be electrically neutral or charged.

Examples of suitable hydrophilic additive include polyvinylpyrrolidone (PVP), hydroxylated polyethersulfone (PES-OH), sulfonated polysulfone (SPSf), polyvinyl alcohol, polyacrylic acid, polymethacrylic acid, polyethyleneglycol, polyacrylamide, sulfonated polystyrene, copolymers thereof, or blends thereof. In certain embodiments, the hydrophilic additive can comprise polyvinylpyrrolidone (PVP), hydroxylated polyethersulfone (PES-OH), sulfonated polysulfone (SPSf), copolymers thereof, or blends thereof. In some examples, the hydrophilic additive can have a weight average molecular weight of from 5,000 Da to 5,000,000 Da, or from 50,000 Da to 2,000,000 Da.

In some embodiments, the hydrophilic additive can be present in the gas permeable polymer in an amount of at least 0.05% by weight (e.g., at least 0.1% by weight, at least 0.25% by weight, at least 0.5% by weight, at least 0.75% by weight, at least 1% by weight, at least 1.25% by weight, at least 1.5% by weight, at least 1.75% by weight, at least 2% by weight, at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, at least 4.75% by weight, at least 5% by weight, at least 6% by weight, at least 7% by weight, at least 8% by weight, at least 9% by weight, at least 10% by weight, at least 15% by weight, at least 20% by weight, at least 25% by weight, or more), based on the total dry weight of the gas permeable polymer and the hydrophilic additive. In some embodiments, the hydrophilic additive can be present in the gas permeable polymer in an amount of 20% or less by weight (e.g., 15% or less by weight, 10% or less by weight, 9% or less by weight, 8% or less by weight, 7% or less by weight, 6% or less by weight, 5% or less by weight, 4.75% or less by weight, 4.5% or less by weight, 4.25% or less by weight, 4% or less by weight, 3.75% or less by weight, 3.5% or less by weight, 3.25% or less by weight, 3% or less by weight, 2.75% or less by weight, 2.5% or less by weight, 2.25% or less by weight, 2% or less by weight, 1.75% or less by weight, 1.5% or less by weight, 1.25% or less by weight, 1% or less by weight, 0.75% or less by weight, 0.5% or less by weight, 0.25% or less by weight, or 0.1% or less by weight), based on the total dry weight of the gas permeable polymer and the hydrophilic additive.

The amount of hydrophilic additive in the gas permeable polymer can range from any of the minimum values described above to any of the maximum values described above. For example, in some embodiments, the hydrophilic additive can be present in the gas permeable polymer in an amount of at least 0.05% to 20% by weight (e.g., from 0.05% to 10% by weight, from 0.05% to 5% by weight, or from 0.1% to 2.5% by weight), based on the total dry weight of the gas permeable polymer and the hydrophilic additive.

By introducing the hydrophilic additive into the gas permeable polymer, the surface properties and morphology of the support layer (and by extension the transport performance of the support layer) can be significantly enhanced relative to identical support layers lacking the hydrophilic additive. In some examples, the support layer can exhibit a surface porosity of from 10% to 25%, an average pore size of from 20 nm to 90 nm, or a combination thereof as measured by scanning electron microscopy (SEM). In some examples, the support layer can exhibit a water contact angle of 75° or less (e.g., a water contact angle of from 60° to 75°), as measured by goniometry. In some embodiments, the support layer can exhibit a $CO_2$ permeance of at least 12,000 GPU (e.g., a $CO_2$ permeance of from 12,000 GPU to 30,000 GPU) at 57° C. and 1 atm feed pressure. The improved properties of the support layer can imbue the resulting composite membranes with improved transport properties.

In certain cases, the gas permeable polymer (and accompanying hydrophilic additive) can be disposed on a base (e.g., a nonwoven fabric such as a polyester nonwoven). The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

The membranes can further include a selective polymer layer disposed on the support layer. In some cases, the selective polymer layer can be a selective polymer matrix through which gas permeates via diffusion or facilitated diffusion. The selective polymer layer can comprise a selective polymer matrix having a $CO_2:N_2$ selectivity of at least 10 at 57° C. and 1 atm feed pressure. For example, the selective polymer matrix can have a $CO_2:N_2$ selectivity of at least 25 (e.g., at least 50, at least 75, at least 100, at least 125, at least 150, at least 175, at least 200, at least 225, at least 250, at least 275, at least 300, at least 325, at least 350, at least 375, at least 400, at least 425, at least 450, or at least 475) at 57° C. and 1 atm feed pressure. In some embodiments, the selective polymer matrix can have a $CO_2:N_2$ selectivity of 500 or less (e.g., 475 or less, 450 or less, 425 or less, 400 or less, 375 or less, 350 or less, 325 or less, 300 or less, 275 or less, 250 or less, 225 or less, 200 or less, 175 or less, 150 or less, 125 or less, 100 or less, 75 or less, 50 or less, or 25 or less) at 57° C. and 1 atm feed pressure.

In certain embodiments, the selective polymer layer can comprise a selective polymer matrix that has a $CO_2:N_2$ selectivity ranging from any of the minimum values described above to any of the maximum values described above. For example, in certain embodiments, the selective polymer layer can comprise a selective polymer matrix that has a $CO_2:N_2$ selectivity of from 10 to 500 at 57° C. and 1 atm feed pressure (e.g., from 10 to 400 at 57° C. and 1 atm feed pressure, from 75 to 400 at 57° C. and 1 atm feed pressure, from 100 to 400 at 57° C. and 1 atm feed pressure, from 10 to 350 at 57° C. and 1 atm feed pressure, from 75 to 350 at 57° C. and 1 atm feed pressure, from 100 to 350 at 57° C. and 1 atm feed pressure, from 10 to 250 at 57° C. and 1 atm feed pressure, from 75 to 250 at 57° C. and 1 atm feed pressure, or from 100 to 250 at 57° C. and 1 atm feed pressure). The $CO_2:N_2$ selectivity of the selective polymer can be measured using standard methods for measuring gas permeance known in the art, such as those described in the examples below.

The selective polymer matrix can comprise a hydrophilic polymer, an amino compound, or a combination thereof. In some embodiments, the hydrophilic polymer can be absent (e.g., the selective polymer matrix can comprise one or more amino compounds). In other embodiments, the selective polymer matrix can comprise a combination of a hydrophilic polymer and an amino compound. For example, in some cases, the selective polymer matrix can comprise an amino compound (e.g., a small molecule, a polymer, or a combination thereof) dispersed in a hydrophilic polymer matrix.

In some embodiments, the amino compound can include a compound (e.g., a small molecule, a polymer, or a combination thereof) comprising one or more primary amine moieties and/or one or more secondary amine moieties. The amino compound can be, for example, an amine-containing polymer, a low molecular weight amino compound (i.e., a small molecule), or a combination thereof.

In some embodiments, the amino compound comprises an amine-containing polymer (also referred to herein as a "fixed carrier"). The amine-containing polymer can have any suitable molecular weight. For example, the amine-containing polymer can have a weight average molecular weight of from 5,000 Da to 2,000,000 Da, or from 50,000 Da to 200,000 Da. Suitable examples of amine-containing polymers include, but are not limited to, polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amine-containing polymer can comprise polyvinylamine (e.g., polyvinylamine having a weight average molecular weight of from 50,000 Da to 100,000 Da). In some embodiments when the amino compound comprises an amine-containing polymer, the hydrophilic polymer is absent. In some embodiments when the amino compound comprises an amine-containing polymer, the selective polymer layer can comprise a blend of an amine-containing polymer and a hydrophilic polymer (e.g., an amine-containing polymer dispersed in a hydrophilic polymer matrix).

In some embodiments, the amino compound can comprise a low molecular weight amino compound (also referred to herein as a "mobile carrier"). The low molecular weight amino compound can have a molecular weight of 1,000 Da or less (e.g., 800 Da or less, 500 or less, 300 Da or less, or 250 Da or less). In some embodiments, the low molecular weight amino compound can be non-volatile at the temperatures at which the membrane will be stored or used. For example, the low molecular weight amino compound can comprise a salt of a primary amine or a salt of a secondary amine. In some embodiments when the amino compound comprises a low molecular weight amino compound, the selective polymer layer can comprise a blend of the low molecular weight amino compound and a hydrophilic polymer (e.g., a low molecular weight amino compound dispersed in a hydrophilic polymer matrix).

In some cases, the low molecular weight amino compound can include an aminoacid salt having the formula:

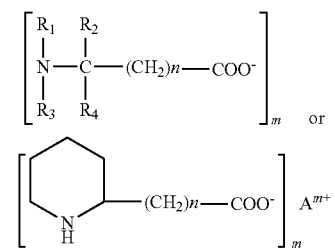

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3. In some cases, the cation ($A^{m+}$) can be an amine cation having the formula:

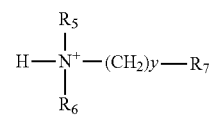

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. In some embodiments, $A^{m+}$ is a metal cation selected from Groups Ia, IIa, and IIIa of the Periodic Table of Elements or a transition metal. For example, $A^{m+}$ can comprise lithium, aluminum, or iron.

Other suitable low molecular weight amino compounds include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

The selective polymer matrix can comprise any suitable amount of the amino compound. For example, in some embodiments, the hydrophilic polymer can be absent. In these embodiments, the selective polymer matrix can comprise from 100% to 80% by weight amino compound, based on the total weight of the components used to form the selective polymer matrix. In some cases, the selective polymer matrix can comprise from 10% to 90% by weight (e.g., from 10% to 50% by weight) amino compound, based on the total weight of the components used to form the selective polymer matrix.

Optionally, the selective polymer matrix can include any suitable hydrophilic polymer. Examples of hydrophilic polymers suitable for use in the selective polymer matrix can include polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the hydrophilic polymer includes polyvinyl alcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da.

The selective polymer matrix can comprise any suitable amount of the hydrophilic polymer. For example, in some cases, the selective polymer matrix can comprise from 10% to 90% by weight (e.g., from 10% to 50% by weight) hydrophilic polymer, based on the total weight of the components used to form the selective polymer matrix.

In some embodiments, the selective polymer matrix can further include a cross-linking agent. Cross-linking agents suitable for use in the selective polymer matrix can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The selective polymer matrix can comprise any suitable amount of the cross-linking agent. For example, the selective polymer matrix can comprise 1 to 40 percent cross-linking agents by weight of the selective polymer matrix.

The selective polymer matrix can further include a base. The base can act as a catalyst to catalyze the cross-linking of the selective polymer matrix (e.g., cross-linking of a hydrophilic polymer with an amine-containing polymer). In some embodiments, the base can remain in the selective polymer matrix and constitute a part of the selective polymer matrix. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The selective polymer matrix can comprise any suitable amount of the base. For example, the selective polymer matrix can comprise 1 to 40 percent base by weight of the selective polymer matrix.

In some embodiments, the selective polymer layer can further comprise carbon nanotubes dispersed within the selective polymer matrix. Any suitable carbon nanotubes (prepared by any suitable method or obtained from a commercial source) can be used. The carbon nanotubes can comprise single-walled carbon nanotubes, multiwalled carbon nanotubes, or a combination thereof.

In some cases, the carbon nanotubes can have an average diameter of a least 10 nm (e.g., at least 20 nm, at least 30 nm, or at least 40 nm). In some cases, the carbon nanotubes can have an average diameter of 50 nm or less (e.g., 40 nm or less, 30 nm or less, or 20 nm or less). In certain embodiments, the carbon nanotubes can have an average diameter ranging from any of the minimum values described above to any of the maximum values described above. For example, the carbon nanotubes can have an average diameter of from 10 nm to 50 nm (e.g., from 10 nm to 30 nm, or from 20 nm to 50 nm).

In some cases, the carbon nanotubes can have an average length of at least 50 nm (e.g., at least 100 nm, at least 200 nm, at least 300 nm, at least 400 nm, at least 500 nm, at least 600 nm, at least 700 nm, at least 800 nm, at least 900 nm, at least 1 µm, at least 5 µm, at least 10 µm, or at least 15 µm). In some cases, the carbon nanotubes can have an average length of 20 µm or less (e.g., 15 µm or less, 10 µm or less, 5 µm or less, 1 µm or less, 900 nm or less, 800 nm or less, 700 nm or less, 600 nm or less, 500 nm or less, 400 nm or less, 300 nm or less, 200 nm or less, or 100 nm or less).

In certain embodiments, the carbon nanotubes can have an average length ranging from any of the minimum values described above to any of the maximum values described above. For example, the carbon nanotubes can have an average length of from 50 nm to 20 µm (e.g., from 200 nm to 20 µm, or from 500 nm to 10 µm).

In some cases, the carbon nanotubes can comprise unfunctionalized carbon nanotubes. In other embodiments, the carbon nanotubes can comprise sidewall functionalized carbon nanotubes. Sidewall functionalized carbon nanotubes are well known in the art. Suitable sidewall functionalized carbon nanotubes can be prepared from unfunctionalized carbon nanotubes, for example, by creating defects on the sidewall by strong acid oxidation. The defects created by the oxidant can subsequently converted to more stable hydroxyl and carboxylic acid groups. The hydroxyl and carboxylic acid groups on the acid treated carbon nanotubes can then coupled to reagents containing other functional groups (e.g., amine-containing reagents), thereby introducing pendant functional groups (e.g., amino groups) on the sidewalls of the carbon nanotubes. In some embodiments, the carbon nanotubes can comprise hydroxy-functionalized carbon nanotubes, carboxy-functionalized carbon nanotubes, amine-functionalized carbon nanotubes, or a combination thereof.

In some embodiments, the selective polymer layer can comprise at least 0.5% (e.g., at least 1%, at least 1.5%, at least 2%, at least 2.5%, at least 3%, at least 3.5%, at least 4%, or at least 4.5%) by weight carbon nanotubes, based on the total dry weight of the selective polymer layer. In some embodiments, the selective polymer layer can comprise 5% or less (e.g., 4.5% or less, 4% or less, 3.5% or less, 3% or less, 2.5% or less, 2% or less, 1.5% or less, or 1% or less) by weight carbon nanotubes, based on the total dry weight of the selective polymer layer.

The selective polymer layer can comprise an amount of carbon nanotubes ranging from any of the minimum values described above to any of the maximum values described above. For example, the selective polymer layer can comprise from 0.5% to 5% (e.g., from 1% to 3%) by weight carbon nanotubes, based on the total dry weight of the selective polymer layer.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective polymer layer can have a thickness of from 50 nanometers to 5 microns (e.g., from 50 nm to 2 microns, or from 100 nanometers to 750 nanometers, or from 250 nanometers to 500 nanometers). In some embodiments, the support layer can have a thickness of from 1 micron to 500 microns (e.g., from 50 to 250 microns). In some cases, the membranes disclosed herein can have a thickness of from 5 microns to 500 microns.

Methods of making these membranes are also disclosed herein. Methods of making membranes can include forming a support layer from a gas permeable polymer and a hydrophilic additive, and depositing selective polymer layer on the support layer to form a selective layer disposed on the support layer.

Figure 2:
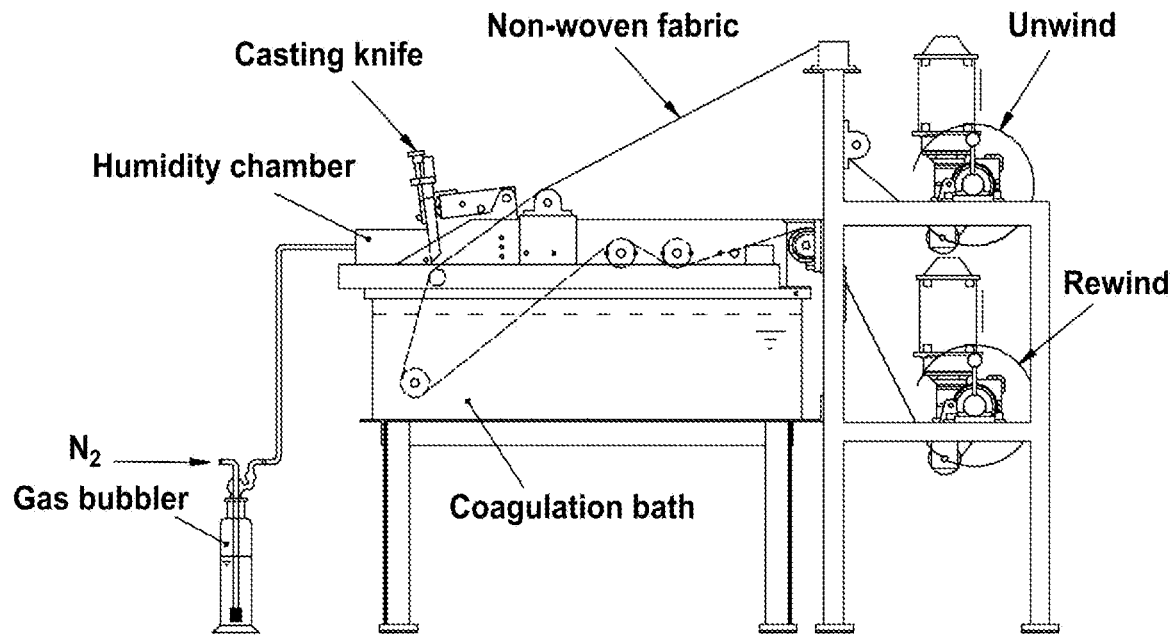
FIG. 2 is a schematic diagram of a pilot-scale continuous casting machine that can be used to prepare the membranes described herein.

The support layer can be prepared by first forming a coating solution including the components of the support layer (e.g., a gas permeable polymer, a hydrophilic additive, and a pore forming agent) in a suitable solvent/non-solvent mixture. Support layers can be fabricated by employing a film applicator in lab scale or a continuous casting machine in pilot scale. In the examples below, the PES membranes were fabricated using a pilot-scale roll-to-roll casting machine, which is illustrated in FIG. 2. The casting solution was continuously cast on the non-woven fabric moving at a speed of 4 ft/min by a stationary stainless steel knife (up to 21-inch wide) with the pre-determined gap setting of 100 μm. A tension of 3 lbf was applied to ensure the flatness of the fabric. The trough holding the casting solution was purged with $N_2$ at a sufficient flow rate (350 cc/min) to prevent the casting solution from phase separation. A humidity chamber was installed after the casting knife and the rolling speed of the fabric could control the exposure time in the humidity chamber. Humid $N_2$ was flowed into the humidity chamber to control the relative humidity. The relative humidity and the exposure time in the humidity chamber were 60% and 6.25 sec, respectively. Subsequently, the cast film was immersed into the water tank to form the support layer. The coagulation bath temperature was controlled at 15-17° C., depending on the desired pore size.

Optionally, the support layer can be pretreated prior to deposition of the selective polymer layer, for example, to remove water or other adsorbed species using methods appropriate to the support and the adsorbate. Examples of absorbed species are, for example, water, alcohols, porogens, and surfactant templates.

The selective polymer layer can be prepared by first forming a coating solution including the components of the selective polymer matrix (e.g., a hydrophilic polymer, an amino compound, or a combination thereof; and optionally a cross-linking agent and a basic compound) in a suitable solvent. One example of a suitable solvent is water. In some embodiments, the amount of water employed will be in the range of from 50% to 99%, by weight of the coating solution. The coating solution can then be used in forming the selective polymer layer. For example, the coating solution can be coated onto a support later (e.g., a nanoporous gas permeable membrane) using any suitable technique, and the solvent may be evaporated such that a nonporous membrane is formed on the substrate. Examples of suitable coating techniques include, but are not limited to, "knife coating" or "dip coating". Knife coating include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, membranes formed from a selective polymer matrix containing for example, a hydrophilic polymer, a cross-linking agent, a base, and an amino compound can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the support layer and the solvent evaporated, as discussed above. In some embodiments, a higher degree of cross-linking for the selective polymer matrix after solvent removal takes place at about 100° C. to about 180° C., and the cross-linking occurs in from about 1 to about 72 hours.

An additive may be included in the selective polymer layer before forming the selective polymer layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making these membranes can be scaled to industrial levels.

Membranes Including Carbon Nanotubes

In some embodiments, the selective polymer layer can comprise a selective polymer matrix and carbon nanotubes dispersed within the selective polymer matrix. The membranes can exhibit selective permeability to gases.

The support layer can be formed from any suitable material. The material used to form the support layer can be chosen based on the end use application of the membrane. In some embodiments, the support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, nitrile-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-iso-propylsiloxane, polydiphenylsiloxane, polyethersulfone, polyphenylsulfone, polysulfone, polyacrylonitrile, polyvinylidene fluoride, polyamide, polyimide, polyetherimide, polyetheretherketone, polyphenylene oxide, polybenzimidazole, polypropylene, polyethylene, partially fluorinated, perfluorinated or sulfonated derivatives thereof, copolymers thereof, or blends thereof. In some embodiments, the gas permeable polymer can be polysulfone or polyethersulfone. If desired, the support layer can include inorganic particles to increase the mechanical strength without altering the permeability of the support layer.

In certain embodiments, the support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

The membranes can further include a selective polymer layer disposed on the support layer. In some cases, the selective polymer layer can be a selective polymer matrix through which gas permeates via diffusion or facilitated diffusion. The selective polymer layer can comprise a selective polymer matrix having a $CO_2:N_2$ selectivity of at least 10 at 57° C. and 1 atm feed pressure. For example, the selective polymer matrix can have a $CO_2:N_2$ selectivity of at least 25 (e.g., at least 50, at least 75, at least 100, at least 125, at least 150, at least 175, at least 200, at least 225, at least 250, at least 275, at least 300, at least 325, at least 350, at least 375, at least 400, at least 425, at least 450, or at least 475) at 57° C. and 1 atm feed pressure. In some embodiments, the selective polymer matrix can have a $CO_2:N_2$ selectivity of 500 or less (e.g., 475 or less, 450 or less, 425 or less, 400 or less, 375 or less, 350 or less, 325 or less, 300 or less, 275 or less, 250 or less, 225 or less, 200 or less, 175 or less, 150 or less, 125 or less, 100 or less, 75 or less, 50 or less, or 25 or less) at 57° C. and 1 atm feed pressure.

In certain embodiments, the selective polymer layer can comprise a selective polymer matrix that has a $CO_2:N_2$ selectivity ranging from any of the minimum values described above to any of the maximum values described above. For example, in certain embodiments, the selective polymer layer can comprise a selective polymer matrix that has a $CO_2:N_2$ selectivity of from 10 to 500 at 57° C. and 1 atm feed pressure (e.g., from 10 to 400 at 57° C. and 1 atm feed pressure, from 75 to 400 at 57° C. and 1 atm feed pressure, from 100 to 400 at 57° C. and 1 atm feed pressure, from 10 to 350 at 57° C. and 1 atm feed pressure, from 75 to 350 at 57° C. and 1 atm feed pressure, from 100 to 350 at 57° C. and 1 atm feed pressure, from 10 to 250 at 57° C. and 1 atm feed pressure, from 75 to 250 at 57° C. and 1 atm feed pressure, or from 100 to 250 at 57° C. and 1 atm feed pressure). The $CO_2:N_2$ selectivity of the selective polymer can be measured using standard methods for measuring gas permeance known in the art, such as those described in the examples below.

The selective polymer matrix can comprise a hydrophilic polymer, an amino compound, or a combination thereof. In some embodiments, the hydrophilic polymer can be absent (e.g., the selective polymer matrix can comprise one or more amino compounds). In other embodiments, the selective polymer matrix can comprise a combination of a hydrophilic polymer and an amino compound. For example, in some cases, the selective polymer matrix can comprise an amino compound (e.g., a small molecule, a polymer, or a combination thereof) dispersed in a hydrophilic polymer matrix.

In some embodiments; the amino compound can include a compound (e.g., a small molecule, a polymer, or a combination thereof) comprising one or more primary amine moieties and/or one or more secondary amine moieties. The amino compound can be, for example, an amine-containing polymer, a low molecular weight amino compound (i.e., a small molecule), or a combination thereof.

In some embodiments, the amino compound comprises an amine-containing polymer (also referred to herein as a "fixed carrier"). The amine-containing polymer can have any suitable molecular weight. For example, the amine-containing polymer can have a weight average molecular weight of from 5,000 Da to 5,000,000 Da, or from 50,000 Da to 2,000,000 Da. Suitable examples of amine-containing polymers include, but are not limited to, polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amine-containing polymer can comprise polyvinylamine (e.g., polyvinylamine having a weight average molecular weight of from 50,000 Da to 2,000,000 Da). In some embodiments when the amino compound comprises an amine-containing polymer, the hydrophilic polymer is absent. In some embodiments when the amino compound comprises an amine-containing polymer, the selective polymer layer can comprise a blend of an amine-containing polymer and a hydrophilic polymer (e.g., an amine-containing polymer dispersed in a hydrophilic polymer matrix).

In some embodiments, the amino compound can comprise a low molecular weight amino compound (also referred to herein as a "mobile carrier"). The low molecular weight amino compound can have a molecular weight of 1,000 Da or less e.g., 800 Da or less, 500 or less, 300 Da or less, or 250 Da or less). In some embodiments, the low molecular weight amino compound can be non-volatile at the temperatures at which the membrane will be stored or used. For example, the low molecular weight amino compound can comprise a salt of a primary amine or a salt of a secondary amine. In some embodiments when the amino compound comprises a low molecular weight amino compound, the selective polymer layer can comprise a blend of the low molecular weight amino compound and a hydrophilic polymer (e.g., a low molecular weight amino compound dispersed in a hydrophilic polymer matrix).

In some cases, the low molecular weight amino compound can include an aminoacid salt having the formula:

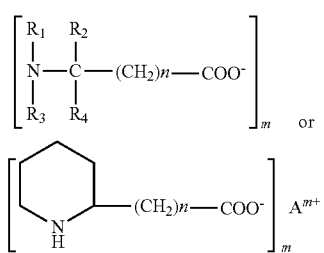

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3, In some cases, the cation ($A^{m+}$) can be an amine cation having the formula:

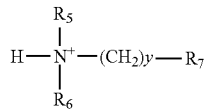

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. In some embodiments, $A^{m+}$ is a metal cation selected from Groups Ia, IIa, and IIIa of the Periodic Table of Elements or a transition metal. For example, $A_{m+}$ can comprise lithium, aluminum, or iron.

Other suitable low molecular weight amino compounds include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

The selective polymer matrix can comprise any suitable amount of the amino compound. For example, in some embodiments, the hydrophilic polymer can be absent. In these embodiments, the selective polymer matrix can comprise from 100% to 80% by weight amino compound, based on the total weight of the components used to form the selective polymer matrix. In some cases, the selective polymer matrix can comprise from 10% to 90% by weight (e.g., from 10% to 50% by weight) amino compound, based on the total weight of the components used to form the selective polymer matrix.

Optionally, the selective polymer matrix can include any suitable hydrophilic polymer. Examples of hydrophilic polymers suitable for use in the selective polymer matrix can include polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the hydrophilic polymer includes polyvinyl alcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da.

The selective polymer matrix can comprise any suitable amount of the hydrophilic polymer. For example, in some cases, the selective polymer matrix can comprise from 10% to 90% by weight (e.g., from 10% to 50% by weight) hydrophilic polymer, based on the total weight of the components used to form the selective polymer matrix.

In some embodiments, the selective polymer matrix can further include a cross-linking agent. Cross-linking agents suitable for use in the selective polymer matrix can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The selective polymer matrix can comprise any suitable amount of the cross-linking agent. For example, the selective polymer matrix can comprise 1 to 40 percent cross-linking agents by weight of the selective polymer matrix.

The selective polymer matrix can further include a base. The base can act as a catalyst to catalyze the cross-linking of the selective polymer matrix (e.g., cross-linking of a hydrophilic polymer with an amine-containing polymer). In some embodiments, the base can remain in the selective polymer matrix and constitute a part of the selective polymer matrix. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The selective polymer matrix can comprise any suitable amount of the base. For example, the selective polymer matrix can comprise 1 to 40 percent base by weight of the selective polymer matrix.

The selective polymer layer further comprises carbon nanotubes dispersed within the selective polymer matrix. Any suitable carbon nanotubes (prepared by any suitable method or obtained from a commercial source) can be used. The carbon nanotubes can comprise single-walled carbon nanotubes, multiwalled carbon nanotubes, or a combination thereof.

In some cases, the carbon nanotubes can have an average diameter of a least 10 nm (e.g., at least 20 nm, at least 30 nm, or at least 40 nm). In some cases, the carbon nanotubes can have an average diameter of 50 nm or less (e.g., 40 nm or less, 30 nm or less, or 20 nm or less). In certain embodiments, the carbon nanotubes can have an average diameter ranging from any of the minimum values described above to any of the maximum values described above. For example, the carbon nanotubes can have an average diameter of from 10 nm to 50 nm (e.g., from 10 nm to 30 nm, or from 20 nm to 50 nm).

In some cases, the carbon nanotubes can have an average length of at least 50 nm (e.g., at least 100 nm, at least 200 nm, at least 300 nm, at least 400 nm, at least 500 nm, at least 600 nm, at least 700 nm, at least 800 nm, at least 900 nm, at least 1 μm, at least 5 μm, at least 10 μm, or at least 15 μm). In some cases, the carbon nanotubes can have an average length of 20 μm or less (e.g., 15 μm or less, 10 μm or less, 5 µm or less, 1 µm or less, 900 nm or less, 800 nm or less, 700 nm or less, 600 nm or less, 500 nm or less, 400 nm or less, 300 nm or less, 200 nm or less, or 100 nm or less).

In certain embodiments, the carbon nanotubes can have an average length ranging from any of the minimum values described above to any of the maximum values described above. For example, the carbon nanotubes can have an average length of from 50 nm to 20 µm (e.g., from 200 nm to 20 µm, or from 500 nm to 10 µm).

In some cases, the carbon nanotubes can comprise unfunctionalized carbon nanotubes. In other embodiments, the carbon nanotubes can comprise sidewall functionalized carbon nanotubes. Sidewall functionalized carbon nanotubes are well known in the art. Suitable sidewall functionalized carbon nanotubes can be prepared from unfunctionalized carbon nanotubes, for example, by creating defects on the sidewall by strong acid oxidation. The defects created by the oxidant can subsequently converted to more stable hydroxyl and carboxylic acid groups. The hydroxyl and carboxylic acid groups on the acid treated carbon nanotubes can then coupled to reagents containing other functional groups (e.g., amine-containing reagents), thereby introducing pendant functional groups (e.g., amino groups) on the sidewalls of the carbon nanotubes. In some embodiments, the carbon nanotubes can comprise hydroxy-functionalized carbon nanotubes, carboxy-functionalized carbon nanotubes, amine-functionalized carbon nanotubes, or a combination thereof.

In some embodiments, the selective polymer layer can comprise at least 0.5% (e.g., at least 1%, at least 1.5%, at least 2%, at least 2.5%, at least 3%, at least 3.5%, at least 4%, or at least 4.5%) by weight carbon nanotubes, based on the total dry weight of the selective polymer layer. In some embodiments, the selective polymer layer can comprise 5% or less (e.g., 4.5% or less, 4% or less, 3.5% or less, 3% or less, 2.5% or less, 2% or less, 1.5% or less, or 1% or less) by weight carbon nanotubes, based on the total dry weight of the selective polymer layer.

The selective polymer layer can comprise an amount of carbon nanotubes ranging from any of the minimum values described above to any of the maximum values described above. For example, the selective polymer layer can comprise from 0.5% to 5% (e.g., from 1% to 3%) by weight carbon nanotubes, based on the total dry weight of the selective polymer layer.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective polymer layer can have a thickness of from 50 nanometers to 5 microns (e.g., from 50 nm to 2 microns, or from 100 nanometers to 750 nanometers, or from 250 nanometers to 500 nanometers). In some embodiments, the support layer can have a thickness of from 1 micron to 500 microns (e.g., from 50 to 250 microns). In some cases, the membranes disclosed herein can have a thickness of from 5 microns to 500 microns.

Methods of making these membranes are also disclosed herein. Methods of making membranes can include depositing selective polymer layer on a support layer to form a selective layer disposed on the support layer. The selective polymer layer can comprise a selective polymer matrix and carbon nanotubes dispersed within the selective polymer matrix.

Optionally, the support layer can be pretreated prior to deposition of the selective polymer layer, for example, to remove water or other adsorbed species using methods appropriate to the support and the adsorbate. Examples of absorbed species are, for example, water, alcohols, porogens, and surfactant templates.

The selective polymer layer can be prepared by first forming a coating solution including the components of the selective polymer matrix (e.g., a hydrophilic polymer, an amino compound, or a combination thereof; and optionally a cross-linking agent and a basic compound) and carbon nanotubes in a suitable solvent. One example of a suitable solvent is water. In some embodiments, the amount of water employed will be in the range of from 50% to 99%, by weight of the coating solution. The coating solution can then be used in forming the selective polymer layer. For example, the coating solution can be coated onto a support later (e.g., a nanoporous gas permeable membrane) using any suitable technique, and the solvent may be evaporated such that a nonporous membrane is formed on the substrate. Examples of suitable coating techniques include, but are not limited to, "knife coating" or "dip coating". Knife coating include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, membranes formed from a selective polymer matrix containing for example, a hydrophilic polymer, a cross-linking agent, a base, an amino compound, and carbon nanotubes can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the support layer and the solvent evaporated, as discussed above. In some embodiments, a higher degree of cross-linking for the selective polymer matrix after solvent removal takes place at about 100° C. to about 180° C., and the cross-linking occurs in from about 1 to about 72 hours.

An additive may be included in the selective polymer layer before forming the selective polymer layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making these membranes can be scaled to industrial levels.

Methods of Use

The membranes disclosed herein can be used for separating gaseous mixtures. For example, provided are methods for separating a first gas from a feed gas comprising the first gas and one or more additional gases (e.g., at least a second gas). The method can include contacting any of the disclosed membranes (e.g., on the side comprising the selective polymer) with the feed gas under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprise at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 100° C. or greater. For example, the membrane can be used at temperatures of from 100° C. to 180° C. In some embodiments, a vacuum can be applied to the permeate face of the membrane to remove the first gas. In some embodiments, a sweep gas can be flowed across the permeate face of the membrane to remove the first gas. Any suitable sweep gas can be used. Examples of suitable sweep gases include, for example, air, steam, nitrogen, argon, helium, and combinations thereof.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, carbon monoxide, or combinations thereof. In some embodiments, the membrane can be selective to hydrogen sulfide versus hydrogen, nitrogen, carbon monoxide, or combinations thereof. In some embodiments, the membrane can be selective to hydrochloric acid gas versus hydrogen, nitrogen, carbon monoxide, or combinations thereof. In some embodiments, the acid gas may be derived from fossil fuels that require hydrogen purification for fuel cell, electricity generation, and hydrogenation applications, biogas for renewable energy, and natural gas for commercial uses. For example, the membranes may be employed in a fuel cell (e.g., to purify feed gases prior to entering the fuel cell). The membranes can also be used for removal of carbon dioxide from flue gas.

The permeance of the first gas or the acid gas can be at least 50 GPU (e.g., 75 GPU or greater, 100 GPU or greater, 150 GPU or greater, 200 GPU or greater, 250 GPU or greater, 300 GPU or greater, 350 GPU or greater, 400 GPU or greater, 450 GPU or greater, 500 GPU or greater, 550 GPU or greater, 600 GPU or greater, 650 GPU or greater, 700 GPU or greater, 750 GPU or greater, 800 GPU or greater, 850 GPU or greater, 900 GPU or greater, 950 GPU or greater, 1000 GPU or greater, 1100 GPU or greater, 1200 GPU or greater, 1300 GPU or greater, or 1400 GPU or greater) at 57° C. and 1 atm feed pressure.

The permeance of the first gas or the acid gas can be 1500 GPU or less at 57° C. and 1 atm feed pressure (e.g., 1400 GPU or less, 1300 GPU or less, 1200 GPU or less, 1100 GPU or less, 1000 GPU or less, 950 GPU or less, 900 GPU or less, 850 GPU or less, 800 GPU or less, 750 GPU or less, 700 GPU or less, 650 GPU or less, 600 GPU or less, 550 GPU or less, 500 GPU or less, 450 GPU or less, 400 GPU or less, 350 GPU or less, 300 GPU or less, 250 GPU or less, 200 GPU or less, 150 GPU or less, 100 GPU or less, or 75 GPU or less).

The permeance of the first gas or the acid gas through the membrane can vary from any of the minimum values described above to any of the maximum values described above. For example, the permeance of the first gas or the acid gas can be from 50 GPU to 1500 GPU at 57° C. and 1 atm feed pressure (e.g., from 300 GPU to 1500 GPU at 120° C., or from 500 GPU to 1500 GPU at 57° C. and 1 atm feed pressure).

In some embodiments, the permeance values for the first gas or the acid gas through the membrane above can be observed at 57° C. and 1 atm feed pressure when a vacuum is applied to the permeate side of the membrane (e.g., at a permeate pressure of 0.2 atm). For example, in some embodiments, the permeance of the first gas or the acid gas can be from 50 GPU to 1500 GPU at 57° C. and 1 atm feed pressure when a vacuum is applied to the permeate side of the membrane (e.g., from 300 GPU to 1500 GPU at 120° C., or from 500 GPU to 1500 GPU at 57° C. and 1 atm feed pressure when a vacuum is applied to the permeate side of the membrane). In certain embodiments, the membrane can exhibit a $CO_2$ permeance of at least 500 GPU (e.g., from 500 to 1500 GPU) at 57° C. and 1 atm feed pressure when a vacuum is applied to the permeate side of the membrane (e.g., at a permeate pressure of 0.2 atm).

The membrane can exhibit a first gas/second gas selectivity of at least 10 at 57° C. and 1 atm feed pressure. In some embodiments, the membrane can exhibit a first gas/second gas selectivity of up to 500 at 57° C. and 1 atm feed pressure. For example, the membrane can exhibit a first gas/second gas selectivity of 10 or greater, 25 or greater, 50 or greater, 75 or greater, 100 or greater, 125 or greater, 150 or greater, 175 or greater, 200 or greater, 225 or greater, 250 or greater, 275 or greater, 300 or greater, 325 or greater, 350 or greater, 375 or greater, 400 or greater, 425 or greater, 450 or greater, or 475 or greater at 57° C. and 1 atm feed pressure. In some embodiments, the permeance and selectivity of the membrane for the first gas or the acid gas can vary at higher or lower temperatures.

Support layers alone (e.g., without a selective polymer layer) can also be used in filtration applications. For example, the support layer as alone can be used as improved ultrafiltration membranes (e.g., for use in protein separations, water purification, wastewater treatment, food processing, etc.).

By way of non-limiting illustration, examples of certain embodiments of the present disclosure are given below.

EXAMPLES

Example 1—Membranes Including a Hydrophilic Additive

Overview

Described herein are nanoporous gas permeable membranes, as well as selectively permeable composite membranes formed from nanoporous gas permeable membranes. The nanoporous gas permeable membranes are formed from a gas permeable polymer (e.g., polyethersulfone (PES)), and a hydrophilic additive, such as polyvinylpyrrolidone (PVP), hydroxylated polyethersulfone (PES-OH), or sulfonated polysulfone (SPSf), dispersed in the gas permeable polymer. The resulting nanoporous gas permeable membranes exhibit improved hydrophilicity and morphology. By incorporating a hydrophilic additive in the PES, the gas permeation resistance of the membrane is decreased as compared to an identical membrane lacking the hydrophilic additive. Moreover, in the case of selectively permeable composite membranes formed from nanoporous gas permeable membranes, a thinner selective polymer layer can be coated on top of the nanoporous gas permeable membranes due to the enhanced hydrophilicity of the membranes as compared to an identical membrane lacking the hydrophilic additive. Both the morphological and hydrophilic modifications can improve the separation performance of selectively permeable composite membranes formed from nanoporous gas permeable membranes. The nanoporous gas permeable membranes can have a porous surface possessing an average pore size of 28.5-70 nm and a surface porosity of 11.4-18.5% with different preparation conditions.

Background

Nanoporous polymer substrates are commonly used as support layers to provide the mechanical strength for composite membranes in gas separation. The surface properties and morphology of the substrate are critical for improving the transport performance of composite membranes. Described herein are effective methods of fabricating polymer (e.g., polyethersulfone (PES)) membranes in pilot scale for composite membrane preparation that can be used for gas separation, such as $CO_2$ separation from flue gas. The resultant improved PES membranes are effective support for the fabrication of composite membranes for gas separations including the removal and capture of $CO_2$ from $N_2$-containing streams, e.g., flue gas.

One shortcoming of PES membranes is its low degree of hydrophilicity, which can cause adhesion issue between a hydrophilic selective polymer layer and the substrate. As a result, a suitable viscosity is the needed for coating an ultra-thin and defect-free selective layer on top of PES substrates. However, if the hydrophilicity of the PES substrate is enhanced, not only the adhesion issue can be resolved, but a uniform and thinner selective layer can be coated on the substrate. Therefore, the surface property becomes a critical factor for the transport performance of composite membranes.

Efforts have been made to improve the hydrophilicity of PES substrates. The commonly used PES hydrophilic modification methods presented in the literature are: (1) bulk modification of PES material by sulfonation or amination, (2) chemical modification of prepared PES membrane by plasma treatment or grafting, and (3) blending with surface hydrophilic additives. The bulk modification is difficult to control, and a minor hydrophilicity improvement is almost impossible to achieve. Moreover, the chemical modification is costly for mass production of the substrate. However, a cost-effective composite membrane is necessary as the membrane area required for gas separation is large, leading to the cost requirement for the substrate fabrication. Blending the PES with other additives, from macromolecules to nanoparticles, is an effective and the simplest method for modifying the PES substrate.

U.S. Pat. No. 8,684,188 describes the modification method to blend PES with hydrophilic polymers, such as PVP and LiCl. According to the patent, the contact angle of the modified PES membrane reduced, compared to the comparative samples without adding hydrophilic polymers. U.S. Pat. No. 5,178,765 discloses a method to blend PES with hydrophilic poly-2-oxazoline and PVP. The resultant membrane exhibited a long-term water wettability. The reported blending methods are efficient and straightforward. However, the hydrophilic PES membrane preparation methods disclosed in the published patents were applied in water treatment or filtration area. The required hydrophilicity in this area is often high to reduce the fouling issue. Nevertheless, an excessive degree of hydrophilicity can induce the selective layer penetration during coating. Therefore, only a small amount of the hydrophilic additive is incorporated in the membranes described herein, leading to a minor increase in the hydrophilicity without causing coating penetration. As a consequence, the PES membranes prepared herein exhibit a suitable hydrophilicity for use as a support layer for the preparation of composite membranes for gas separation.

Moreover, the morphology of the substrate impacts a membrane's separation performance because it significantly impacts gas permeation resistance. The gas permeation resistance of a multi-layer composite membrane comprises the resistances from each layer. For a high permeance selective layer, the underlying support layer can provide over 10% of the total resistance if the substrate morphology is not open enough. Both the substrate's bulk morphology as well as the surface morphology (including pore size and porosity) contribute to the gas permeation resistance. The surface geometry restricts the transport of a gas molecule from the selective layer to the substrate (i.e., the support layer) because of the lateral diffusion to the substrate pores. Increasing the porosity can improve the separation performance because of the reduction in the effective diffusion length. In addition to enhancing hydrophilicity, the addition of hydrophilic additives can also improve the surface geometry as well as the bulk morphology. By incorporating a hydrophilic additive into the PES, the gas permeation resistance of the nanoporous gas permeable membrane (PES substrate) is reduced by 100% or more, as compared to membranes of identical composition but lacking the hydrophilic additive.

Also described are fabrication processes that provide for the efficient and cost-effective fabricate of improved nanoporous gas permeable membranes (e.g., PES substrates) that be used as support layers in composite membranes for gas separation. These methods are compatible with the mass production of the improved composite membranes for gas separation.

Materials and Methods

Casting Solutions for Nanoporous Gas Permeable Membranes

The typical casting solution for the nanoporous gas permeable membranes include PES polymer, ahydrophilic additive, a solvent, and a pore forming agent. N-methyl-2-pyrrolidone (NMP) and water were employed as solvent and non-solvent, respectively. 2-Methoxyethanol (2-ME) was incorporated into the casting solution as a pore-forming additive because of its high affinity with water, leading to an interconnected spongy structure in the bulk of the substrate. First, the casting solution was prepared by dissolving PES (or PES and hydrophilic additives) into an appropriate amount of NMP under magnetic stirring at 80° C. for 6 hours until the solution was clear and homogeneous. Then, the solution was cooled down to room temperature and 2-ME was added dropwise to minimize phase separation. A typical PES content was 14 wt % in the solution and the weight ratio of NMP to 2-ME was 35/58. The solution was kept under magnetic stirring overnight. All the procedures were carried out under an $N_2$ shower. After stirring overnight, the solution could be used for the subsequent casting Pilot Scale Casting Process The nanoporous PES membranes were fabricated by vapor- and non-solvent-induced phase inversion steps successively. The PES membranes can be fabricated by employing a film applicator in lab scale or a continuous casting machine in pilot scale. In the examples below, the PES membranes were fabricated using a pilot-scale roll-to-roll casting machine, which is illustrated in FIG. 2. The casting solution was continuously cast on the non-woven fabric moving at a speed of 4 ft/min by a stationary stainless steel knife (up to 21-inch wide) with the pre-determined gap setting of 100 μm. A tension of 3 lbf was applied to ensure the flatness of the fabric. The trough holding the casting solution was purged with $N_2$ at a sufficient flow rate (350 cc/min) to prevent the casting solution from phase separation. A humidity chamber was installed after the casting knife and the rolling speed of the fabric could control the exposure time in the humidity chamber. Humid $N_2$ was flowed into the humidity chamber to control the relative humidity. The relative humidity and the exposure time in the humidity chamber were 60% and 6.25 sec, respectively. Subsequently, the cast film was immersed into the water tank to form the PES membrane. The coagulation bath temperature was controlled at 15-17° C., depending on the desired pore size.

Gas Transport Property Characterization

The gas transport properties of the fabricated PES membranes and the composite membranes were characterized via a gas permeation testing apparatus. Briefly, the membrane was loaded into a rectangular stainless-steel cell with an effective area of 2.7 cm$^2$ and a countercurrent flow configuration. A feed gas mixture of 20% $CO_2$ and 80% $N_2$ on a dry basis and a sweep gas of argon (Ar) were controlled by the mass flow controllers (Brooks instrument, Hatfield, Pa.). The feed and sweep gas flow rate were 92 and 30 cc/min, respectively. Moreover, the pressures were adjusted to be 1.5 psig and 1.2 psig for feed and sweep side, respectively. The temperature was controlled at 57° C. via a temperature-controlled oven (Bemco Inc. Simi Valley, Calif.). The saturation water content of 17.2% at 57° C. (the typical flue gas temperature) were applied for both feed and sweep sides in all the transport experiments by humidifying the feed and sweep gases through stainless steel humidifiers (Swagelok, Westerville, Ohio, U.S.A.) filled with Raschig glass ring packing. 100 ml water was pumped into the humidifier for both sides before the transport measurements. After the retentate and permeate gas streams were dried by their respective knockout vessels and drierite tubes, they were sent to a gas chromatograph (GC) for composition analysis. Then, the gas compositions were used for $CO_2$ permeance and $CO_2/N_2$ selectivity calculation Example 1A PES polymer (Ultrason® E7020P from BASF) and PVP K90 (Luvitec® from BASF) was used to prepare nanoporous gas permeable membranes (also referred to herein as PES substrates). The detailed solution composition is summarized in Table 1. A weight ratio of NMP/2-ME of 35/58 was used, corresponding to the NMP and 2-ME concentrations in casting solution of 32.27 wt. % and 53.48 wt. %, respectively. The casting solution was prepared according to the aforementioned procedure, and the PES substrate was cast by the continuous casting machine shown in FIG. 2. The operation parameters, except the water coagulation bath temperature, during the casting process were kept the same for all the examples hereinafter. The coagulation bath temperature was controlled at 17° C. in Example 1A.

TABLE 1

Solution composition for the PES substrate in Example 1A.

| PES concentration (wt. %) | PVP concentration (wt. %) | NMP/2-ME weight ratio |
|---|---|---|
| 14 | 0.25 | 35/58 |

Figure 3B:
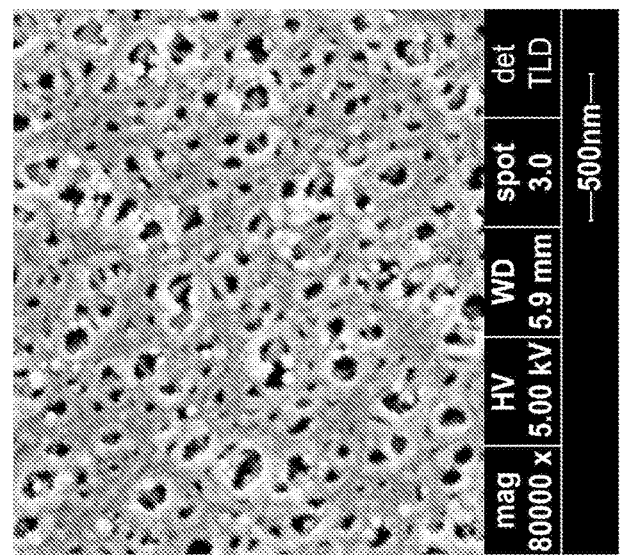
FIG. 3B is a micrograph showing the surface morphology of the PES membrane prepared in Comparative Example 1B.
Figure 3A:
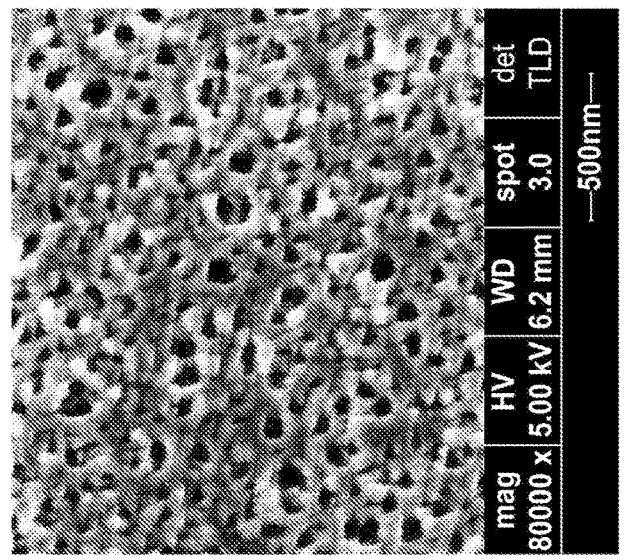
FIG. 3A is a micrograph showing the surface morphology of the PES membrane prepared in Example 1A.

FIG. 3A shows the surface morphology of the PES substrate in Example 1A. The average pore size and surface porosity were 46.5 nm and 14.3%, respectively. An identical membrane lacking the hydrophilic additive (PVP), prepared in Comparative Example 1B below, exhibited the average pore size and surface porosity were 41 nm and 12%, respectively. The addition of PVP increased the pore size and porosity, which led to a decreased gas permeation resistance. As shown in Table 2, the $CO_2$ permeance of the PVP-modified PES substrate was 22500 GPU (1 GPU=$10^{-6}$ cm$^3$ (STP)·cm$^{-2}$·s$^{-1}$·cmHg$^{-1}$), which was more than two times higher than the $CO_2$ permeance of the unmodified PES substrate (9200 GPU in Comparative Example 1B), which is shown in Table 3. An open morphology favoring gas transport was obtained after the incorporation of PVP. Tables 2 and 3 also exhibit that the contact angle of the substrate in Example 1A was lower than that of the substrate in Comparative Example 1B, indicating the improvement on the hydrophilicity of the improved PES substrate

TABLE 2

Summary of the transport result and surface morphology of the PES substrate in Example 1A.

| Average pore size (nm) | Surface porosity (%) | Contact angle | $CO_2$ permeance (GPU) |
|---|---|---|---|
| 48.5 | 14.1 | 66° | 22500 |

Comparative Example 1B

A pristine, unmodified PES substrate (a membrane prepared without any hydrophilic additive) was prepared to compare with the membrane prepared in Example 1A. A PES concentration of 14 wt. % and a NMP/2-ME weight ratio of 35/58 were applied. The similar solution preparation procedure and casting process described in Example 1A were used. The coagulation bath temperature was controlled at 17° C. Table 3 shows the surface morphology, contact angle and the $CO_2$ permeance of the pristine, unmodified PES substrate. This substrate was used as a reference for showing the improvements of the modified, improved PES substrates.

TABLE 3

Summary of the transport result and surface morphology of the PES substrate in Comparative Example 1B.

| Average pore size (nm) | Surface porosity (%) | Contact angle | $CO_2$ permeance (GPU) |
|---|---|---|---|
| 41 | 12 | 78° | 9200 |

Example 1C

Figure 4:
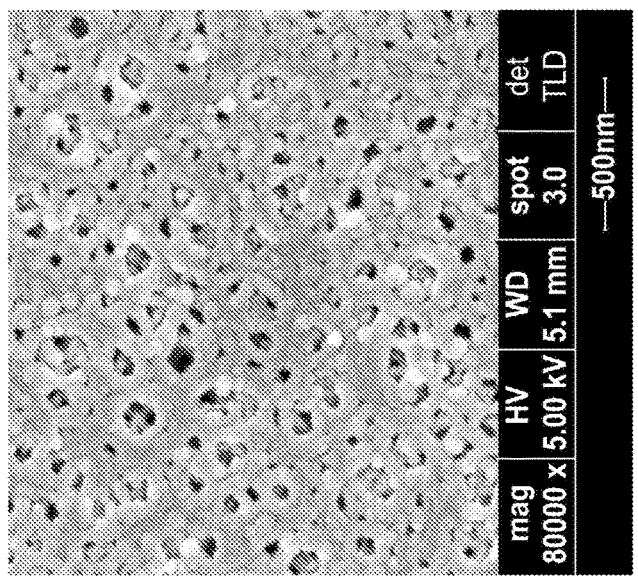
FIG. 4 is a micrograph showing the surface morphology of the PES membrane prepared in Example 1C.

A hydrophilic PES substrate was prepared by the same procedure described in Example 1A except that a lower content of PVP (Luvitec® K90 from BASF) was incorporated. The detailed solution composition is summarized in Table 4. FIG. 4 shows the surface morphology of the prepared PES substrate, and Table 5 summarizes the surface morphology, contact angle and the $CO_2$ permeance of the modified PES substrate in Example 1C. As shown, the average pore size and surface porosity were 38.7 nm and 13.4%, respectively. Compared to Comparative Example 1B, a more open morphology was obtained as the $CO_2$ permeance of Example 1C was 22000 GPU. The lower contact angle in Example 2 indicates the improved hydrophilicity of the modified PES substrate.

TABLE 4

Solution composition of PES substrate in Example 1C.

| PES concentration (wt. %) | PVP concentration (wt. %) | NMP/2-ME weight ratio |
|---|---|---|
| 14 | 0.1 | 35/58 |

TABLE 5

Summary of the transport results and surface morphology of the PES substrate in Example 1C.

| Average pore size (nm) | Surface porosity (%) | Contact angle | $CO_2$ permeance (GPU) |
|---|---|---|---|
| 38.7 | 13.4 | 70° | 22000 |

Example 1D

Figure 5:
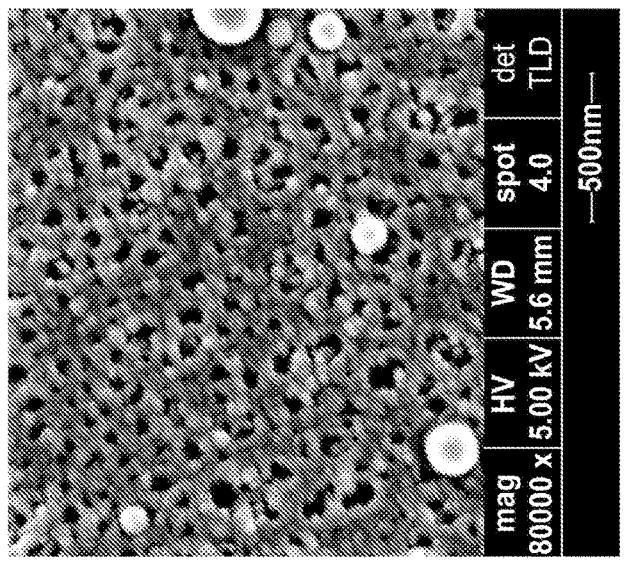
FIG. 5 is a micrograph showing the surface morphology of the PES membrane prepared in Example 1D.

A hydrophilic PES substrate was obtained by the same procedure described in Example 1A. A different molecular weight PVP (Luvitec® K30 from BASF) was incorporated with a concentration of 0.025 wt. %. The PES concentration and the NMP/2-ME weight ratio were kept as 14 wt. % and 35/58, respectively. The coagulation bath temperature was controlled at 15° C. FIG. 5 shows the surface morphology of the prepared PES substrate, and Table 6 summarizes the surface morphology, contact angle and the $CO_2$ permeance of the modified, improved PES substrate. As shown, the $CO_2$ permeance of the modified, improved PES in Example 1D (19000 GPU) was higher than that of the pristine, unmodified PES substrate in Comparative Example 1B (9200 GPU), which was due to the more open morphology. The lower contact angle in Example 1D shows the improved hydrophilicity of the modified, improved PES substrate.

TABLE 6

Summary of the transport results and surface morphology of the PES substrate in Example 1D.

| Average pore size (nm) | Surface porosity (%) | Contact angle | $CO_2$ permeance (GPU) |
|---|---|---|---|
| 35.7 | 12.8 | 72° | 19000 |

Example 1E

Figure 6:
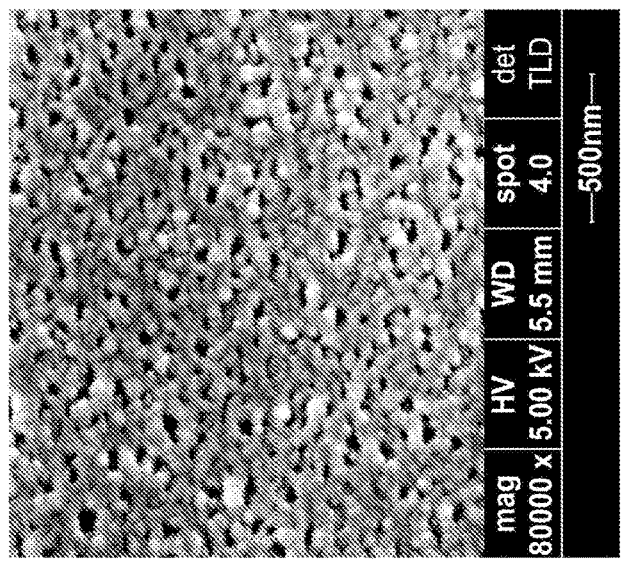
FIG. 6 is a micrograph showing the surface morphology of the PES membrane prepared in Example 1E.

A hydrophilic PES substrate was prepared by the same procedure described in Example 1A. A different molecular weight PVP (Luvitec® K30 from BASF) was incorporated with a concentration of 0.01 wt. %. The PES concentration and the NMP/2-ME weight ratio were kept as 14 wt. % and 35/58, respectively. The coagulation bath temperature was controlled at 15° C. FIG. 6 shows the surface morphology of the prepared PES substrate, and Table 7 summarizes the surface morphology, contact angle and the $CO_2$ permeance of the modified, improved PES substrate. As shown, the $CO_2$ permeance of the modified PES in Example 1E (18000 GPU) was higher than that of the pristine, unmodified PES substrate in Comparative Example 1B (9200 GPU), which could be explained by the more open morphology. An improved hydrophilicity of the modified PES substrate in Example 1E was obtained as shown by the reduced contact angle in Table 7.

TABLE 7

Summary of the transport results and surface morphology of the PES substrate in Example 1E.

| Average pore size (nm) | Surface porosity (%) | Contact angle | $CO_2$ permeance (GPU) |
|---|---|---|---|
| 28.5 | 11.4 | 74° | 18000 |

Example 1F

Figure 7:
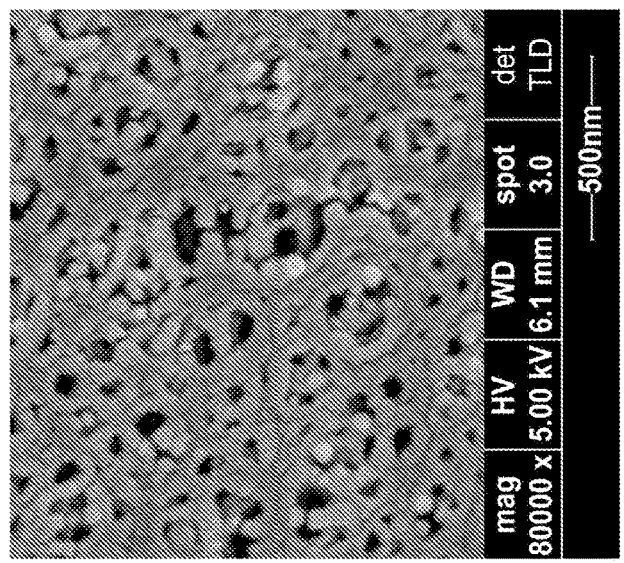
FIG. 7 is a micrograph showing the surface morphology of the PES membrane prepared in Example 1F.

The casting solution was prepared by the same procedure described in Example 1A. A hydroxylated PES (SUMIKAEXCEL 5003PS from Sumitomo Chemical Co. Ltd.), with a hydroxylation degree of 1%, was employed as the hydrophilic additive in Example 1F. The detailed casting solution composition is shown in Table 8. The hydrophilic PES membrane was obtained by using the casting process described in Example 1A, except the coagulation bath temperature was controlled at 17° C. FIG. 7 shows the surface morphology of the prepared PES substrate, and Table 9 summarizes the surface morphology, contact angle and the $CO_2$ permeance of the modified PES substrate. As shown, the $CO_2$ permeance of the modified PES in Example 1F (14100 GPU) was higher than that of the pristine, unmodified PES substrate in Comparative Example 1B (9200 GPU), which could be attributed to a more open morphology. As listed in Table 9, the reduced contact angle in Example 1F indicates the improved hydrophilicity of the modified, improved PES substrate.

TABLE 8

Solution composition of PES substrate in Example 1F.

| PES concentration (wt. %) | PES-OH concentration (wt. %) | NMP/2-ME weight ratio |
|---|---|---|
| 5.6 | 8.4 | 35/58 |

TABLE 9

Summary of the transport results and surface morphology of the PES substrate in Example 1F.

| Average pore size (nm) | Surface porosity (%) | Contact angle | $CO_2$ permeance (GPU) |
|---|---|---|---|
| 55.5 | 15.8 | 71° | 14100 |

Example 1G

Figure 8:
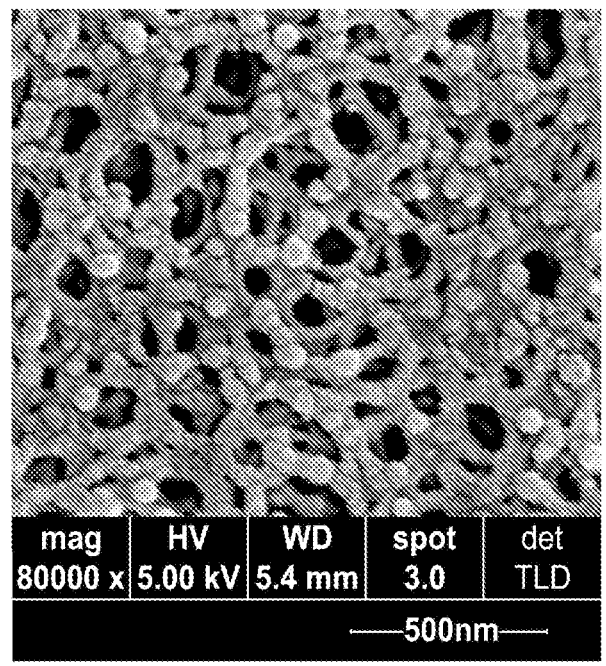
FIG. 8 is a micrograph showing the surface morphology of the PES membrane prepared in Example 1G.
Figure 9:
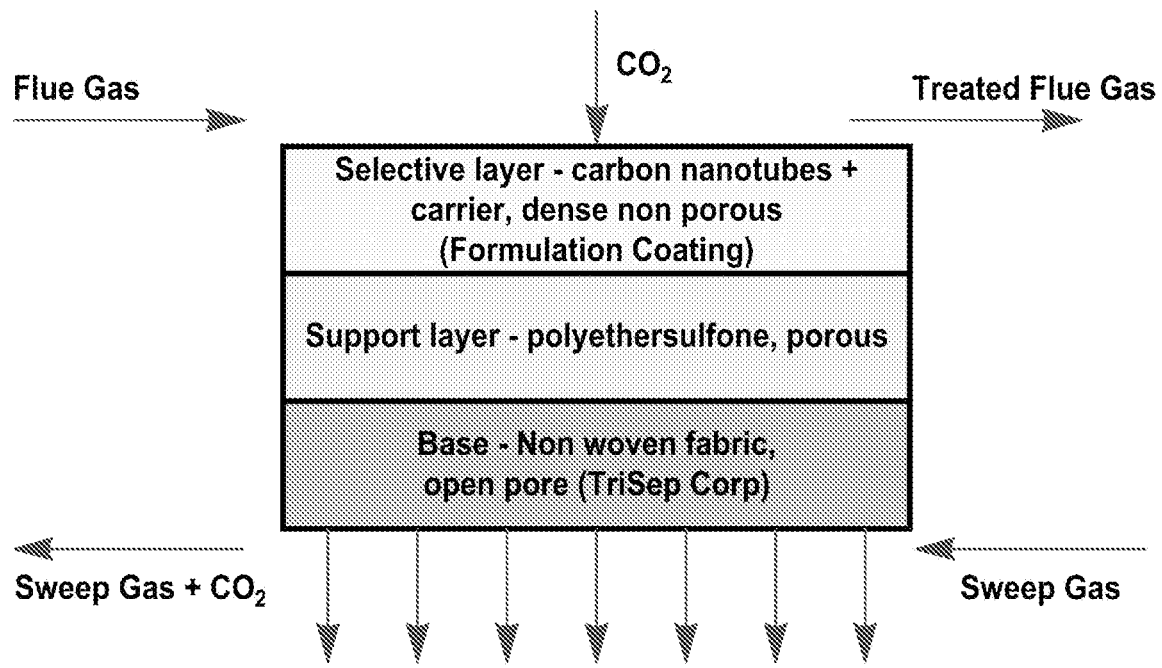
FIG. 9 is a schematic diagram illustrating the composition of the membranes described herein including carbon nanotubes.

The casting solution was prepared by the same procedure described in Example 1A. A sulfonated polysulfone, with a sulfonation degree of 6%, was employed as the hydrophilic additive in Example 1G. The detailed casting solution composition is shown in Table 10. The hydrophilic PES membrane was obtained by using the casting process described in Example 1A, except the coagulation bath temperature was controlled at 17° C. FIG. 8 shows the surface morphology of the prepared PES substrate, and Table 11 summarizes the surface morphology, contact angle and the $CO_2$ permeance of the modified PES substrate. As shown, the $CO_2$ permeance of the modified, improved PES in Example 1G (12800 GPU) was higher than that of the pristine, unmodified PES substrate in Comparative Example 1B (9200 GPU). The reduced gas permeation resistance for this substrate was because of its more open morphology. The lower contact angle of 70° in Example 1G, shown in Table 11, indicates the improved hydrophilicity of the modified PES substrate.

TABLE 10

Solution composition of PES substrate in Example 1G.

| PES concentration (wt. %) | SPSf concentration (wt. %) | NMP/2-ME weight ratio |
|---|---|---|
| 11.9 | 2.1 | 35/58 |

TABLE 11

Summary of the transport results and surface morphology of the PES substrate in Example 1G.

| Average pore size (nm) | Surface porosity (%) | Contact angle | $CO_2$ permeance (GPU) |
|---|---|---|---|
| 70 | 18.5 | 70° | 12800 |

Example 111

An amine-containing polymeric selective layer was coated on each substrate of Examples 1A-1G described above to form the composite membranes. The selective layer includes polyvinylamine (PVAm), which served as a fixed-site carrier, and piperazine glycinate (PG), which served as a mobile carrier. PVAm and PG were mixed with a weight ratio of 35/65. A viscosity of the coating solution (about 1000 cp) was used to coat a selective layer on the substrate without defects. A selective layer thickness of ~175 nm was employed for all the composite membranes. The gas transport properties of the composite membranes were measured by the procedure described previously.

Table 12 lists the transport results of the prepared composite membranes by using the substrate fabricated from Examples 1A-1G. As shown, compared to the membrane coated on the substrate from Comparative Example 1B, all the composite membranes by employing the modified PES substrates from Examples 1A-1G demonstrated improved separation performances, which were due to the less gas permeation resistance after incorporating the hydrophilic additives. For instance, the $CO_2$ permeance of the modified PES in Example 1A improved over 100%, compared to the unmodified PES substrate in Comparative Example 1B. Therefore, the $CO_2$ permeances of the composite membranes coated on substrates in Example 1A and Comparative Example 1B were 825 and 785 GPU, respectively. Moreover, the $CO_2/N_2$ selectivity values of the composite membranes coated on substrates in Example 1A and Comparative Example 1B were 153 and 145, respectively. The improved $CO_2$ permeance could be attributed to the less gas permeation resistance of the modified substrate, and the improved $CO_2/N_2$ selectivity could be explained by the enhanced hydrophilicity for the improved adhesion of the selective layer coating.

TABLE 12

Separation performance of the composite membranes with the substrates fabricated from Examples 1A-1G.

| Membrane | Substrate (Support Layer) | $CO_2$ permeance (GPU) | $CO_2/N_2$ selectivity |
|---|---|---|---|
| 1 | Example 1A | 825 | 153 |
| 2 | Comparative Example 1B | 785 | 145 |
| 3 | Example 1C | 840 | 150 |
| 4 | Example 1D | 813 | 156 |
| 5 | Example 1E | 803 | 152 |
| 6 | Example 1F | 836 | 148 |
| 7 | Example 1G | 815 | 150 |

Example 2—Membranes Including Carbon Nanotubes

Overview

Described herein are selectively permeable membranes that include carbon nanotubes. The membranes can be used for $CO_2/N_2$ separation, in particular, in applications where a vacuum is pulled on the permeate side of the membrane. The selective polymer layer of the membranes can include an amine-containing polymer, and an amino acid salt dispersed within the amine-containing polymer as a mobile carrier to facilitate the transport of $CO_2$. Untreated and/or functionalized carbon nanotubes can be incorporated into the selective polymer layer, where it functions as a rigid inorganic filler. Unfunctionalized carbon nanotubes as well as sidewall functionalized carbon nanotubes (e.g., hydroxy-functionalized carbon nanotubes, carboxy-functionalized carbon nanotubes, or amine-functionalized carbon nanotubes) can be utilized. The carbon nanotubes can increase the rigidity of the selective polymer layer, which can reduce the penetration of the selective polymer layer into the nanoporous support layer under vacuum. This can improve the function (e.g., the $CO_2$ permeance, the $CO_2$ selectivity, or a combination thereof) of the membrane under applied vacuum relative to an identical membrane lacking carbon nanotubes in the selective polymer layer.

Background

There has been growing concern about global warming since the $CO_2$ concentration in the atmosphere has surpassed 400 ppm in the past decade. The combustion of fossil fuels is one of the major contributors to the large amount of $CO_2$ emission, and membrane technologies have been suggested as a promising approach to capture $CO_2$ from large stationary sources (e.g., flue gases from coal-fired and natural gas-fired power plants), followed by compression and geological sequestration. Multiple research efforts were dedicated in designing membrane processes that can capture 90% $CO_2$ from the power plant flue gases with a $CO_2$ purity of at least 95%. A common element in many of these processes is a vacuum membrane stage where a vacuum is pulled on the permeate side of the membrane to provide a transmembrane driving force. In these situations, the membrane is subject to a pressure differential from the feed to the permeate side. However, in many cases, the applied vacuum significantly decreases the $CO_2$ permeance of the membrane (e.g., by 50% or more).

As discussed below, the diminished membrane performance under applied vacuum is believed to be the consequence of the vacuum driving penetration of the selective polymer layer into the nanoporous support layer. Herein, it is demonstrated that the membrane performance can be enhanced by incorporating carbon nanotubes into the selective polymer layer of the membrane.

Materials and Methods

Both single-walled and multiwalled carbon nanotubes, as well as derivatives of these nanotubes synthesized by sidewall functionalization (e.g., defect oxidation followed by hydroxylation (—OH), carboxylation (—COOH), and/or amination (—$NH_2$)), can be incorporated in the membranes described herein. The nanotubes can range in length from 50 nm to 100 μm, (e.g., 200 nm to 20 μm). The nanotubes can have any suitable diameter. For example, in some cases, the nanotubes can have a diameter of from 10 nm to 50 nm. Multiwalled carbon nanotubes, commercially available under the trade name Graphistrength® C100 (0.1-10 μm length, 10-15 nm diameter) from Arkema Inc. (Philadelphia, Pa.) were used for these proof-of-principle studies.

Similarly, a wide variety of amine-containing polymers can be used to form the selective polymer matrix. Examples of suitable amine containing polymers include polyvinylamine (PVAm), polyallylamine, polyethylenimine, amine-containing dendrimers, copolymers thereof, and blends thereof. In some cases, the amine-containing polymer can have a weight average molecular weight of from 300 to 3,000 kDa. In certain cases, the amine-containing polymer can have a weight average molecular weight of at least 1000 kDa. For these proof-of-principle studies, PVAm purified from a commercial product available under the trade name Polymin® VX from BASF (Vandalia, Ill.) was used. The PVAm had a weight average molecular weight of 2,000 kDa.

In certain embodiments, an amino acid salt can be blended in the amine-containing polymer to further facilitate the $CO_2$ transport. The salt of any amino acid may be used. However, for these proof-of-principle studies, piperazine glycinate was used.

Functionalization and Dispersion of Carbon Nanotubes

The commercially available carbon nanotubes were difficult to disperse in water because they were supplied as heavily entangled bundles. Accordingly, ultrasonication was used to effectively disperse the carbon nanotubes in water. Several approaches were used to facilitate the dispersion and stabilization of the carbon nanotubes in water. First, sodium dodecyl sulfate was added to reduce the surface tension of the carbon nanotubes, thereby preventing the aggregation. Second, defects were created on the sidewall of a carbon nanotube by strong acid oxidation. The defects created by the oxidant were subsequently converted to more stable hydroxyl and carboxylic acid groups. Third, the hydroxyl and carboxylic acid groups on the acid treated carbon nanotubes were coupled to amine-containing reagents (thereby introducing pendant amino groups on the carbon nanotubes). By introducing charged groups on the sidewalls of the carbon nanotubes, the aggregation of the carbon nanotubes can be inhibited by electric repulsion.

Membrane Preparation

The coating solution for the membrane synthesis was prepared by adding the dispersed carbon nanotubes to a solution of the amine-containing polymer to a dispersion with a certain polymer concentration and carbon nanotube loading. The carbon nanotubes were then well dispersed in the polymer by conducting another ultrasonication. Next, a certain amount of amino acid salt was incorporated in the dispersion to form the coating solution. The coating solution was then coated on a polyethersulfone (PES) nanoporous substrate by the "knife coating" technique. After the water was evaporated, and the membrane was then used for gas permeation measurements.

Transport Measurements

Gas permeation measurements were carried out using a permeation apparatus as described below. The membrane was loaded into a stainless-steel rectangular permeation cell inside a temperature-controlled oven (Bemco Inc. Simi Valley, Calif.) with an effective membrane area of 2.7 $cm^2$. On the feed side, a 92 sccm binary gas mixture containing 20% $CO_2$ and 80% $N_2$ was humidified using a 500 mL stainless-steel humidifier (Swagelok, Westerville, Ohio) filled with 60 vol. % packing of Raschig rings and 100 mL water at 57° C. The feed pressure was controlled at 1.5 psig by a near ambient pressure regulator. On the permeate side, either a humid argon sweep or a vacuum was used to provide a transmembrane driving force. When the sweep gas was used, 30 sccm dry argon was humidified by a humidifier identical to the feed-side humidifier. The pressure of the argon sweep was controlled at 1.0 psig using a near ambient pressure regulator. The feed and sweep gases were in a countercurrent flow pattern. The compositions of the retentate and permeate streams were be analyzed using a gas chromatograph (GC) equipped with thermal conductivity detectors (Agilent Technologies, Palo Alto, Calif.). A SUPELCO Carboxen® 1004 micropacked GC column (Sigma-Aldrich, St. Louis, Mo.) was installed for the analysis. If vacuum was pulled, the permeate side of the permeation cell was connected to a vacuum diaphragm pump (Ebara Corporation, Tokyo, Japan). The permeate pressure was controlled at 0.2 atm by a vacuum regulator (Alicat Scientific, Inc., Tucson, Ariz.). Before the permeate stream entered the vacuum pump, it passed through a 1 L stainless-steel water knockout (Swagelok, Westerville, Ohio) that was cooled by a chiller (Fisher Scientific, Hampton, N.H.) at 0° C. to remove moisture from the permeate. The discharge of the vacuum pump was carried by a 30 sccm dry argon sweep to the GC for composition analysis.

Example 2A: Membrane Prepared without Carbon Nanotubes

In Example 2A, a membrane comprising a selective polymer layer comprising a selective polymer matrix (an amine-containing polymer and an amino acid salt dispersed in the amine-containing polymer) without any carbon nanotubes was prepared.

Briefly, 10 g of PVAm aqueous solution (1.5 wt. %, ~200 cp viscosity) was concentrated to 4 wt. % by evaporating the water with a $N_2$ purge. 1.013 g piperazine glycinate aqueous solution (27.5 wt. %) was added into the concentrated PVAm solution to form a homogeneous coating solution. The coating solution had a PVAm-to-piperazine glycinate ratio of 35/65 (wt./wt.), which rendered a viscosity of approximately 1700 cp. A GARDCO adjustable micrometer film applicator (Paul N. Gardner Company, Pompano Beach, Fla.) was used to cast the coating solution on a nanoporous PES substrate with an average surface pore size of 38.7 nm. The membrane was dried overnight before the gas permeation test. A selective layer thickness of 170 nm was achieved by adjusting the gap setting of the film applicator.

The membrane was tested with both argon sweep and vacuum. For the test with argon sweep, the feed and permeate pressures were 1.5 and 1 psig, respectively, corresponding to a feed-to-permeate pressure ratio of ~1. For the test with vacuum, the feed pressure was 1.5 psig while the permeate pressure was 0.2 atm, resulting in a feed-to-permeate pressure ratio of ~5. The $CO_2$ permeances and $CO_2/N_2$ selectivities from the two different testing conditions are shown in Table 13 below. As shown in Table 13, the membrane exhibited a desirable $CO_2$ permeance of 840 GPU (1 GPU=$10^{-6}$ cm$^3$ (STP)·cm$^{-2}$·s$^{-1}$·cmHg$^{-1}$) with a high $CO_2/N_2$ selectivity of 150 when tested by the argon sweep. When a vacuum was pulled on the permeate side, however, the permeance was reduced to 473 GPU. With a feed gas saturated with water vapor at 57° C., the PVAm in the selective layer was highly swelled. The suction on the permeate side dragged the selective layer into the pores of the nanoporous substrate, thereby increasing the mass transfer resistance for $CO_2$. Thus, the deteriorated performance under vacuum can be tied to the lack of mechanical strength in the selective polymer layer.

Example 2B: Membrane Prepared Using Unfunctionalized Carbon Nanotubes

In Example 2B, unfunctionalized multiwalled carbon nanotubes were incorporated in the selective polymer layer to enhance its mechanical strength.

Briefly, carbon nanotubes were dispersed in water with the aid of sodium dodecyl sulfate. 1 g of sodium dodecyl sulfate was added in 98 g water under mild mixing to avoid frothing. Then, 1 g of Graphistrength® C100 multiwalled carbon nanotubes were added in the solution. The mixture was sonicated in an ultrasonication bath at 20 kHz with a power of 60 W for 24 hours till a good dispersion was obtained. The carbon nanotube dispersion was centrifuged at 6000 rpm for 3 min before use. Before incorporating the carbon nanotubes, the PVAm aqueous solution was concentrated. 20 g of dilute PVAm solution (1.5 wt. %) was concentrated to 6 wt. % by evaporating the water under a $N_2$ purge. Then, 1.750 g carbon nanotube dispersion (1 wt. %) was added in the concentrated PVAm solution dropwise under vigorous mixing. Next, the mixture was sonicated in the ultrasonication bath to re-disperse the carbon nanotubes, which took 48 hours. Finally, 2.026 g piperazine glycinate aqueous solution (27.5 wt. %) was added to the dispersion to form a homogeneous coating solution. The viscosity of the coating solution, however, was approximately 150 cp. The coating solution was cast on the nanoporous PES substrate as described in Example 2A above. After overnight drying, the selective polymer layer contained 2 wt. % carbon nanotubes in the total solid content and the PVAm-to-piperazine glycinate ratio was still 35/65 (wt./wt.).

The membrane prepared in Example 2B was also tested with argon sweep and vacuum, respectively. The transport results are reported in Table 13. Owing to the improved mechanical strength of the selective polymer layer (a consequence of the carbon nanotubes dispersed in the selective polymer matrix), the $CO_2$ permeance under vacuum was improved to 617 GPU. However, it was still 205 GPU lower than the one demonstrated by argon sweep Example 2C: Membrane Prepared Using Acid Treated Carbon Nanotubes In Example 2C, acid treated multiwalled carbon nanotubes were incorporated in the selective polymer layer to enhance its mechanical strength.

The acid treatment of carbon nanotubes was conducted as described below. First, 90 mL sulfuric acid (98%) was added to a 500 mL round-bottom flask cooled in an ice/water bath. 30 mL of nitric acid (2.6 M) was added to the sulfuric acid dropwise under vigorous mixing. 0.8 g of multiwalled carbon nanotubes were added in the acid mixture, and the suspension was sonicated in an ultrasonication bath for 30 min to preliminarily break up the nanotube aggregates. Then, the suspension was transferred to an oil bath at 120° C. and the oxidation reaction was carried out for 90 min under reflux. The suspension was cooled to room temperature, and 300 mL water was added gradually to dilute the concentrated sulfuric acid. The residual acid was removed by washing the acid treated carbon nanotubes with water under vacuum filtration. Microporous Teflon membrane with 0.2-0.4 µm pore size was used for the filtration. The filtration was conducted until the filtrate pH reached 7. The resulting acid treated carbon nanotubes were dispersed in water with a concentration of 1 wt. % by the ultrasonication bath as described in Example 2B.

Before incorporating the acid treated carbon nanotubes, the PVAm aqueous solution was concentrated. 20 g of dilute PVAm solution (1.5 wt. %) was concentrated to 6 wt. % by evaporating the water under a $N_2$ purge. Then, 1.750 g of the acid treated carbon nanotube dispersion (1 wt. %) was added to the concentrated PVAm solution dropwise under vigorous mixing. Once a drop of the dispersion was added, the acid treated carbon nanotubes precipitated out, and the polymer solution tended to gel. The next drop was not added until the precipitate was broken into fine pieces by the strong mixing and the polymer solution was fluidized again. Next, the mixture was sonicated in the ultrasonication bath for 16 hours to re-disperse the nanotubes. Finally, 2.026 g of the piperazine glycinate aqueous solution (27.5 wt. %) was added to the dispersion to form a homogeneous coating solution. The viscosity of the coating solution was only approximately 300 cp. The coating solution was cast on the nanoporous PES substrate as described in Example 2A. After overnight drying, the selective polymer layer contained 2 wt. % acid treated carbon nanotubes in the total solid content, and the PVAm-to-piperazine glycinate ratio was still 35/65 (wt./wt.).

The membrane prepared in Example 2C was also tested with argon sweep and vacuum, respectively. The transport results are reported in Table 13. The incorporation of the acid treated carbon nanotubes in the selective polymer layer further improved the $CO_2$ permeance (to 751 GPU), which was 278 GPU higher than the membrane containing no carbon nanotubes.

Example 2D: Membrane Prepared Using Amine Functionalized Carbon Nanotubes

In Example 2D, amine functionalized multiwalled carbon nanotubes were incorporated in the selective polymer layer to enhance its mechanical strength.

Briefly, the acid treated carbon nanotubes prepared as described in Example 2C were further functionalized with amino groups. The amino-functionalization was carried out as follows. First, 3-aminopropyltriethoxysilane was dissolved in acetone with a concentration of 5 wt. %. 0.4 g of 3-aminopropyltriethoxysilane solution was added to 20 g of the acid treated carbon nanotube dispersion (1 wt. %). The mixture was then allowed to react at 80° C. for 30 min under vigorous mixing. The resultant mixture was re-dispersed using an ultrasonication bath as described in Example 2B.

Before incorporating the amine functionalized carbon nanotubes, the PVAm aqueous solution was concentrated. 20 g of dilute PVAm solution (1.5 wt. %) was concentrated to 6 wt. % by evaporating the water under a $N_2$ purge. Then, 2.188 g of the amine-functionalized carbon nanotube dispersion (0.8 wt. %) was added in the concentrated PVAm solution dropwise under vigorous mixing. The mixture was sonicated in the ultrasonication bath for 16 hours to re-disperse the nanotubes. Finally, 2.026 g of the piperazine glycinate aqueous solution (27.5 wt. %) was added in the dispersion to form a homogeneous coating solution. The viscosity of the coating solution was approximately 500 cp. The coating solution was cast on the nanoporous PES substrate as described in Example 2A. The average pore size of the PES substrate was 15.0 nm. After overnight drying, the selective polymer layer contained 2 wt. % amino-functionalized carbon nanotubes in the total solid content, and the PVAm-to-piperazine glycinate ratio was 35/65 (wt./wt.).

The membrane prepared in Example 2D was also tested with argon sweep and vacuum, respectively. The transport results are reported in Table 13. The incorporation of amino-functionalized carbon nanotubes further improved $CO_2$ the permeance (to 807 GPU). The exhibited permeance under applied vacuum was close to the permeance observed using only an argon sweep.

TABLE 13

Transport results of the membranes prepared in Examples 2A-2D.

| Membrane | Sweep | | Vacuum | |
|---|---|---|---|---|
| | $CO_2$ permeance (GPU) | $CO_2/N_2$ ideal selectivity | $CO_2$ permeance (GPU) | $CO_2/N_2$ ideal selectivity |
| Example 2A | 840 | 150 | 473 | 194 |
| Example 2B | 822 | 136 | 617 | 168 |
| Example 2C | 783 | 155 | 751 | 187 |
| Example 2D | 815 | 144 | 807 | 161 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A membrane comprising:
   a support layer; and
   a selective polymer layer disposed on the support layer;
   wherein the support layer comprises a gas permeable polymer and hydrophilic additive dispersed within the gas permeable polymer,
   wherein the hydrophilic additive comprises a hydrophilic polymer, and
   wherein the selective polymer layer has a $CO_2:N_2$ selectivity of at least 10 at 57° C. and 1 atm feed pressure.

2. The membrane of claim 1, wherein the selective polymer layer has a $CO_2:N_2$ selectivity of from 10 to 500 at 57° C. and 1 atm feed pressure.

3. The membrane of claim 1, wherein the selective polymer layer comprises a hydrophilic polymer, an amino compound, or a combination thereof.

4. The membrane of claim 3, wherein the amino compound comprises an amine-containing polymer.

5. The membrane of claim 4, wherein the amine-containing polymer is selected from the group consisting of polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof.

6. The membrane of claim 4, wherein the amine-containing polymer comprises polyvinylamine.

7. The membrane of claim 3, wherein the amino compound comprises a low molecular weight amino compound.

8. The membrane of claim 7, wherein the low molecular weight amino compound has a molecular weight of less than 1,000 Da.

9. The membrane of claim 7, wherein the low molecular weight amino compound comprises a salt of a primary amine or a salt of a secondary amine.

10. The membrane of claim 7, wherein the low molecular weight amino compound comprises a salt selected from the group consisting of aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

11. The membrane of claim 3, wherein the hydrophilic polymer comprises a polymer selected from the group consisting of polyvinylalcohol, polyvinylacetate, polyethylene oxide, polyvinylpyrrolidone, polyacrylamine, a polyamine, polysiloxane, copolymers thereof, and blends thereof.

12. The membrane of claim 1, wherein the selective polymer layer further comprises a cross-linking agent.

13. The membrane of claim 12, wherein the cross-linking agent comprises a compound selected from the group consisting of formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof.

14. The membrane of claim 1, wherein the selective polymer layer further comprises carbon nanotubes.

15. The membrane of claim 14, wherein the carbon nanotubes comprise single walled carbon nanotubes, multi-walled carbon nanotubes, or a combination thereof.

16. The membrane of claim 14, wherein the selective polymer layer comprises from 0.5% to 5% by weight carbon nanotubes, based on the total dry weight of the selective polymer layer.

17. The membrane of claim 14, wherein the carbon nanotubes have an average diameter of from 10 nm to 50 nm.

18. The membrane of claim 14, wherein the carbon nanotubes have an average length of from 50 nm to 20 µm.

19. The membrane of claim 14, wherein the carbon nanotubes comprise sidewall functionalized carbon nanotubes.

20. The membrane of claim 19, wherein the sidewall functionalized carbon nanotubes comprise hydroxy-functionalized carbon nanotubes, carboxy-functionalized carbon nanotubes, amine-functionalized carbon nanotubes, or a combination thereof.

21. The membrane of claim 1, wherein the gas permeable polymer comprises polyethersulfone or polysulfone.

22. The membrane of claim 1, wherein the hydrophilic additive comprises a hydrophilic polymer.

23. The membrane of claim 1, wherein the hydrophilic additive comprises polyvinylpyrrolidone (PVP), hydroxylated polyethersulfone (PES-OH), sulfonated polysulfone (SPSf), copolymers thereof, or blends thereof.

24. The membrane of claim 1, wherein the hydrophilic additive is present in the gas permeable polymer in an amount from 0.05% to 20% by weight, based on the total dry weight of the gas permeable polymer and the hydrophilic additive.

25. The membrane of claim 1, wherein the support layer exhibits a surface porosity of from 10% to 25% and an average pore size of from 20 nm to 90 nm, as measured by scanning electron microscopy (SEM).

26. The membrane of claim 1, wherein the support layer exhibits a water contact angle of 75° or less.

27. The membrane of claim 1, wherein the support layer exhibits a $CO_2$ permeance of at least 12,000 GPU at 57° C. and 1 atm feed pressure.

28. The membrane of claim 1, wherein the membrane further comprises a permeable layer disposed between the support layer and the selective polymer layer.

29. The membrane of claim 28, wherein the permeable layer comprises a gas permeable polymer chosen from poly(dimethylsiloxane), poly(trimethylsilylpropyne), poly(4-methyl-1-pentene), copolymers thereof, and blends thereof.

30. A method for separating a first gas from a feed gas stream, the method comprising contacting a membrane defined by claim 1 with the feed gas stream comprising the first gas under conditions effective to afford transmembrane permeation of the first gas.

31. A membrane comprising:
a support layer; and
a selective polymer layer disposed on the support layer;
wherein the support layer comprises a gas permeable polymer and hydrophilic additive dispersed within the gas permeable polymer,
wherein the membrane further comprises a permeable layer disposed between the support layer and the selective polymer layer,
wherein the hydrophilic additive comprises a hydrophilic polymer, and
wherein the permeable layer comprises a gas permeable polymer chosen from poly(dimethylsiloxane), poly(trimethylsilylpropyne), poly(4-methyl-1-pentene), copolymers thereof, and blends thereof.

* * * * *